(12) United States Patent
Wittek

(10) Patent No.: US 9,249,910 B2
(45) Date of Patent: Feb. 2, 2016

(54) TRANSITIONAL ELEMENTS FOR THE TRANSFER OF DISPERSIONS DURING PROCESSING IN A ROTOR-STATOR DISPERSION MACHINE

(71) Applicant: Axel Wittek, Ottenbuettel (DE)

(72) Inventor: Axel Wittek, Ottenbuettel (DE)

( * ) Notice: Subject to any disclaimer, the term of this patent is extended or adjusted under 35 U.S.C. 154(b) by 292 days.

(21) Appl. No.: 13/751,292

(22) Filed: Jan. 28, 2013

(65) Prior Publication Data

US 2013/0135961 A1    May 30, 2013

Related U.S. Application Data

(62) Division of application No. 13/062,296, filed as application No. PCT/EP2009/006377 on Sep. 3, 2009, now Pat. No. 8,820,796.

(30) Foreign Application Priority Data

Sep. 5, 2008   (DE) .......................... 10 2008 045 820

(51) Int. Cl.
   *B01F 7/00*       (2006.01)
   *B01F 15/02*      (2006.01)
   (Continued)

(52) U.S. Cl.
   CPC ........... *F16L 25/0009* (2013.01); *B01F 3/0807* (2013.01); *B01F 3/0853* (2013.01);
   (Continued)

(58) Field of Classification Search
   CPC . B01F 15/0266; B01F 3/0853; F16L 25/0009
   USPC ............ 366/129, 184, 331, 328, 334.5, 332.1
   See application file for complete search history.

(56) References Cited

U.S. PATENT DOCUMENTS

RE6,488   E  *  6/1875  Van Duzer ............... 285/133.11
1,950,947  A  *  3/1934  Mulroyan ................ 285/148.22
(Continued)

FOREIGN PATENT DOCUMENTS

DE    2740075 A1    3/1978
DE    3341674 A1    5/1985
(Continued)

OTHER PUBLICATIONS

"International Search Report and Written Opinion for International Application No. PCT/EP2009/006377", Apr. 29, 2010, Publisher: International Searching Authority, Published in: DE.
(Continued)

*Primary Examiner* — Tony G Soohoo
(74) *Attorney, Agent, or Firm* — Kaplan Breyer Schwarz & Ottesen, LLP

(57) ABSTRACT

To avoid even in rotor-stator dispersion machines with high suction power that the drawn liquid is set into a rotational movement whereby the dispersion performance is impaired, the invention provides transitional elements, such as an intermediate piece, for establishing the connection between a rotor-stator dispersion machine and a container. The rotor-stator dispersion machine comprises a rotor-stator system having at least one toothed ring. The container has a longitudinal axis and an outlet. The intermediate piece has a first opening for the connection with the outlet of the container and a second opening for the connection with the rotor-stator dispersion machine. The intermediate piece comprises a tube line that extends between the first and the second opening and has at least in some sections a longitudinal axis that is inclined relative to the longitudinal axis of the container by an angle $a_{30}$ in the range of 0° to 90°.

10 Claims, 20 Drawing Sheets

(51) Int. Cl.
*F16L 25/00* (2006.01)
*B01F 3/08* (2006.01)
*B01F 5/10* (2006.01)
*B01F 7/16* (2006.01)
*B01F 13/10* (2006.01)
*B01F 7/02* (2006.01)

(52) U.S. Cl.
CPC ............ *B01F 5/104* (2013.01); *B01F 7/00266* (2013.01); *B01F 7/00766* (2013.01); *B01F 7/166* (2013.01); *B01F 13/1027* (2013.01); *B01F 15/0201* (2013.01); *B01F 15/0266* (2013.01); *B01F 7/00208* (2013.01); *B01F 7/00633* (2013.01); *B01F 7/021* (2013.01)

(56) References Cited

U.S. PATENT DOCUMENTS

| | | | | |
|---|---|---|---|---|
| 2,625,305 | A * | 1/1953 | Conkling | 222/330 |
| 3,423,075 | A * | 1/1969 | Munjee et al. | 366/181.1 |
| 5,160,811 | A * | 11/1992 | Ritzmann | 174/68.3 |
| D342,130 | S * | 12/1993 | Anderson et al. | D23/393 |
| 5,689,852 | A * | 11/1997 | Svoboda et al. | 15/405 |
| 5,915,735 | A * | 6/1999 | Noble | 285/4 |
| 6,494,609 | B1 * | 12/2002 | Wittbold et al. | 366/192 |
| 7,390,251 | B2 * | 6/2008 | Hadlock, Jr. | 454/330 |
| 7,676,882 | B1 * | 3/2010 | Safiol | 15/257.1 |
| 2003/0043689 | A1 * | 3/2003 | Jang et al. | 366/165.2 |
| 2006/0016922 | A1 * | 1/2006 | Klaumunzner | 241/97 |
| 2007/0008815 | A1 * | 1/2007 | Nakamura et al. | 366/172.1 |
| 2011/0187099 | A1 * | 8/2011 | Wittek | 285/405 |
| 2012/0287748 | A1 * | 11/2012 | Pourcel et al. | 366/194 |
| 2013/0184416 | A1 * | 7/2013 | Eckert et al. | 525/450 |

FOREIGN PATENT DOCUMENTS

| | | |
|---|---|---|
| DE | 8333124.7 U1 | 6/1988 |
| DE | 29608712 U1 | 9/1996 |
| DE | 20002959 U1 | 8/2000 |
| DE | 19537303 B4 | 4/2005 |
| DE | 202006011077 U1 | 10/2006 |
| EP | 1121974 A1 | 8/2001 |
| EP | 1475143 A2 | 11/2004 |
| EP | 1693102 A | 8/2006 |
| EP | 1712271 A2 | 10/2006 |
| WO | 2009135624 A2 | 11/2009 |

OTHER PUBLICATIONS

Dipl.-Ing Wenger, Hausruf, "Related German Patent Application No. 10 2008 045 820.1 Office Action", Sep. 8, 2009, Publisher: Deutsches Patent—und Markenamt, Published in: DE.

* cited by examiner

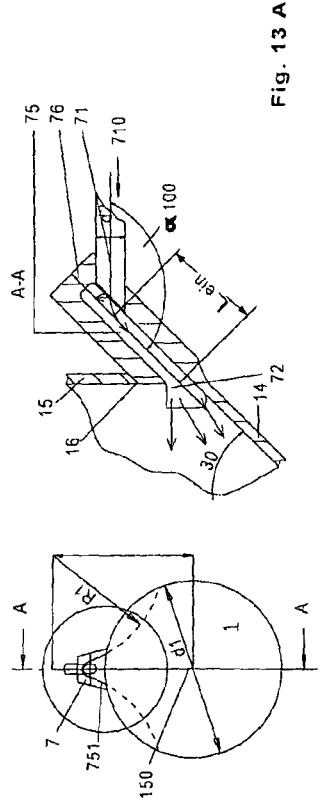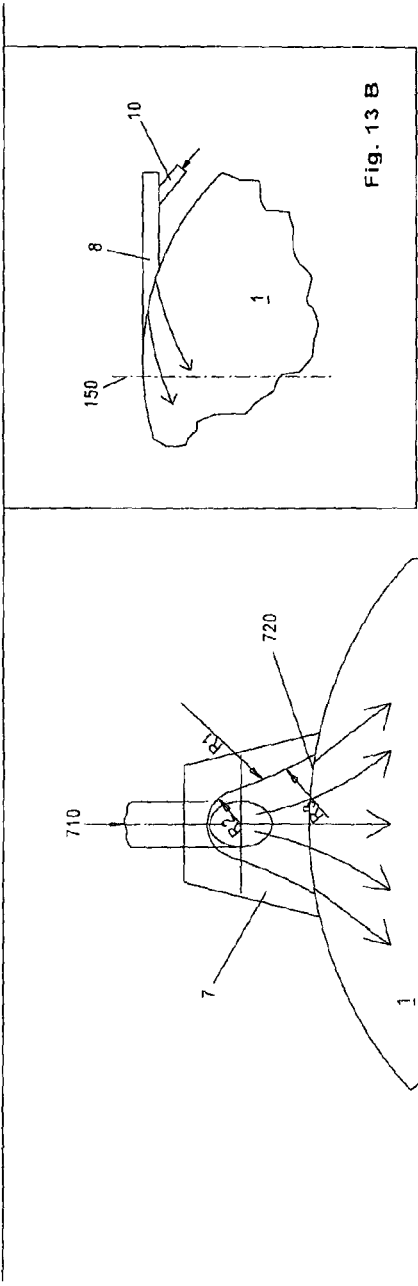
Fig. 13 A
Fig. 13 B
Fig. 13 C
Fig. 13

TRANSITIONAL ELEMENTS FOR THE TRANSFER OF DISPERSIONS DURING PROCESSING IN A ROTOR-STATOR DISPERSION MACHINE

CROSS-REFERENCE TO RELATED APPLICATIONS

This application is a Divisional of and claims priority to U.S. patent application Ser. No. 13/062,296 with a 371 entry date of Mar. 4, 2011, which in turn claims priority to International Application Serial Number PCT/EP2009/006377 filed on Sep. 3, 2009, and German Application Number DE 10 2008 045 820.1 filed on Sep. 5, 2008. Furthermore, U.S. patent application Ser. No. 13/062,296 is incorporated herein by reference.

FIELD OF THE INVENTION

The invention relates generally to transitional elements for the transfer of dispersions during processing in an installation system with a rotor-stator dispersion machine. Specifically, the invention provides an intermediate piece for connecting a rotor-stator dispersion machine with a container, an outlet means for connecting the rotor-stator dispersion machine with a discharge apparatus, in particular a tube line, and an inlet pipe for adding a fluid to the container.

BACKGROUND OF THE INVENTION

In process engineering the general practice for the preparation of products involves working with ratios of quantities as set forth in a recipe. Some raw materials are added in gram-range quantities, others in large quantities. In addition, some raw materials require high shear rates when being added, others low shear rates. When producing dispersions, in particular when producing emulsions, in order to achieve a final product with the desired properties in terms of the size distribution of the disperse phase, flow properties and stability of the product relative to thermal and mechanical stresses as well as changes over time, it is extremely important that the necessary steps for adding the inner phase in the outer phase are defined and reliably implemented in terms of the process technology both during the dispersion as well as the stabilization of the obtained product. Dispersions, in particular emulsions, are produced industrially by various processes. The selected process depends on the type of the dispersion as well as on the fineness of the dispersed or particulate phase that is suitable for achieving a stable dispersion over the required time period. A stable dispersion is defined as a material system having a particle size distribution of the dispersed phase and/or flow properties, in particular, the viscosity of which does not change substantially over the prescribed time period.

Partial over-concentration is often encountered especially in emulsions and suspensions with a high disperse-phase portion; i.e., localized and/or temporal deviations regarding particle density in the surrounding fluid. According to conventional methods, such over-concentrations can only be homogenized by operation with extended mixing and dispersion times. The risk for the occurrence of over-concentrations is intensified for containers with low filling levels because the commonly used devices set the liquid that is inside the container into a rotating motion. This causes a reduction of the actual energy quota that is introduced into the fluid. Said effect is especially pronounced under vacuum conditions when the drawing-in of the fluid from the container is disrupted.

Consequently, it is necessary to maintain a certain minimum filling level inside the container in order to be able to feed the premix with the desired defined properties to the rotor-stator dispersion machine and to prevent, in particular, any aspiration of air into the rotor-stator system. To achieve full dispersion power this minimum batch volume is approximately 35% of the maximum filling level of the container for the current rotor-stator dispersion machines that are commercially available. Only if these conditions are met, will there no longer be any detectable differences in the droplet-size distributions between partial and full batches.

The usual rotor-stator dispersion machines therefore come with the disadvantage of having a relatively high minimum filling level. This is why the possibilities for varying batch quantities that are to be processed by a machine, so-called batch size ranges, are very limited. In addition, the minimum filling level must also be maintained when running the cleaning applications of the machines; thus, large quantities of cleaning agent are needed. This means a relatively large quantity of fluid is always being moved around inside the respective installation and the total power that is introduced in the fluid is dissipated inside this large volume, whereby the achieved energy density inside the product is relatively small. This can result in inefficient conditions for the dispersing action. Moreover, there is a risk that the particles and/or the drops of an emulsion coalesce.

SUMMARY OF THE INVENTION

Therefore, one of the objects of the present inventions consists in providing larger flexibility in terms of the batch size ranges, which means to provide for a possibility of providing a larger band in which minimum to maximum size batches can be satisfactorily processed. In addition, another objective of the present invention envisions achieving an enhanced energy application inside the product by improving the utilization of the applied power, thereby allowing for an efficient break-down of drops. Moreover, another objective of the invention envisions preventing, in as much as possible, the coalescing of drops and/or aggregation of particles when they leave the rotor-stator dispersion machine. In addition, the invention envisions providing for faster batch times, which means fewer runs and, consequently, faster times for achieving the completion of the dispersion task.

The invention provides an intermediate piece for the connection of a rotor-stator dispersion machine with a container. The rotor-stator dispersion machine comprises a rotor-stator system having at least one toothed ring. The container has a longitudinal axis and an outlet. The intermediate piece comprises a first opening for establishing the connection with the outlet of the container and a second opening for establishing the connection with the rotor-stator dispersion machine. The intermediate piece comprises a tube line extending between the first and second openings and having at least in some sections a longitudinal axis that is inclined by an angle $a_{30}$ (alpha_30) in the range of 0° to 90° relative to the longitudinal axis of the container.

The inventor realized that especially rotor-stator dispersion machines with high suction power tend to set the suctioned fluid into a rotating motion, which in turn reduces the dispersing power. In emulsions this results in a broad range of drop-size distributions and/or larger mean drop-size diameters. Moreover, eddies may form inside the container and air may be drawn into the product. If the rotor-stator system has high-performance suction, an auxiliary conveying means is frequently necessary, such as a propeller agitator, in order to feed sufficient product into the rotor-stator system. But the rotation of the product before it flows into the rotor-stator system also occurs and/or is even promoted by the auxiliary conveying means in the form of a propeller.

Since the invention causes, due to the inclined intermediate piece, a disruption of the rotation of the fluid before the feed stream enters the rotor-stator dispersion machine, these problems are avoided. The invention thus achieves the objectives as set forth above and helps to overcome the disadvantages of conventional rotor-stator systems. The intermediate piece determines the installation angle for the connection of the dispersion machine and the container. By reducing the rotational movement of the product it is possible to achieve minimum batch sizes of 10% of the maximum container content.

An advantageous improvement envisions an angle $a_{30}$ between the longitudinal axis of the tube line and the longitudinal axis of the container. In this context, the intermediate piece is envisioned to establish the connection of a rotor-stator dispersion machine with a container having a container floor that tapers toward the outlet at an angle $a_{Konus}$ (alpha_konus). Thus, the value for angle $a_{30}$ is essentially one half of $a_{Konus}$. This way, it is possible for the feed stream of the product to be added over a sufficiently large area from the container, and essentially directly over the tapered container floor, to the dispersion machine.

In a further embodied example of the intermediate piece according the invention the tube line comprises at least one area where the wall of the tube line, as seen from its longitudinal axis, arches toward the outside. This provides for the possibility of additionally directing the fluid stream, before it enters the rotor-stator dispersion system, in such a way that any rotation is prevented. In particular, it is envisioned that the area of the wall where the tube line, as seen from its longitudinal axis, arches toward the outside opens into the second opening of the intermediate piece for the connection with the rotor-stator dispersion machine.

Depending on what type of fluid must be processed, it may be possible to forego the insertion of the arched section. To be able to respond flexibly to different process requirements, the invention envisions in one advantageous improvement according to the invention that the intermediate piece is configured in multiple parts comprising at least two parts that are detachably connectable with each other. A first part comprises the pipe in the connection with the first opening. A second part comprises the area where the wall of the tube line, as seen from its longitudinal axis, arches toward the outside.

One improvement of the present invention offers the advantage of avoiding a rigid constraint of the rotor-stator dispersion machine, thereby also reducing, in particular, the noise development of the machine during operation as well allowing for compensating for expansions and/or the occurrence of bending moments acting upon the rotor-stator dispersion machine, in particular in batches at higher temperature and CIP cleaning and/or sanitizing at high temperatures. To this end, the second part of the intermediate piece comprises at least in the area where the wall of the tube line arches toward the outside, as seen from its longitudinal axis, a flexible element; specifically, it is defined by the flexible element. Used as a flexible element is, for example, a suitably shaped rubber bellows.

To be able to provide an additional conveying means for rotor-stator systems with high suction power the invention further envisions that the area where the wall of the tube line, as seen from its longitudinal axis, arches toward the outside defines a chamber for receiving such a conveying means for transporting the feed stream of a fluid from the container to the rotor-stator dispersion machine, in particular for receiving at least one blade of an agitator. In an especially preferred embodied example the chamber for receiving a conveying means is, adjusted to the dimensions of the conveying means, in particular adjusted to the diameter of the agitator blade, dimensioned specifically in such a way, that during operation the part $\Delta V = V - V_{RS}$ of the fluid that is fed to the rotor-stator dispersion machine by the conveying means V (V_point) that exceeds the conveying power of the rotor-stator dispersion machine $V_{RS}$ (V_point_RS) is directed from the pressure side of the conveying means along the arched wall of the chamber to the suction side of the conveying means.

To provide for a further possibility for disrupting any rotation in the fluid stream that is fed into the rotor-stator dispersion machine the invention envisions that the intermediate piece comprise a part that grips around the tube line immediately before the second opening of the intermediate piece and that contains at least one, preferably three, and especially preferably four, flow disrupters. These can be configured, in particular as so-called "Sanitary" flow disrupters. A configuration in which the flow disrupters are dimensioned in such a way that they, when the intermediate piece is connected with the dispersion machine, extend until a point closely above the rotor-stator system, in particular closely above the rotor, has proved especially favorable. The distance between the flow disrupter and the rotor is preferably approximately 0.25% to approximately 1% of the diameter of the rotor.

In order to be able to achieve an especially reliably targeted stream of the fluid when it flows toward the rotor-stator system the invention provides a conveying means for use in the above-described intermediate piece, and wherein the conveying means comprises an agitator with at least one agitator blade and a sleeve that envelops the agitator blade.

The sleeve that can also be called a guide sleeve with regard to the fluid that it conveys during operation; it constitutes a jacket around the mixer blade, thereby preventing any radial and outward release of fluid, as viewed from the agitator shaft. By preventing the radial release of fluid the guide sleeve provides for a higher reflux from the pressure side to the suction side of the agitator. This way, a propeller-type agitator can convey, for example, double or triple the volume flow that is processed by the rotor-stator system. The propeller is positioned, with the guide sleeve, inside the flexible element in such a way that the corresponding suction excess is optimally recirculated in a direction diagonally upstream in front of the mixer blade. The recirculation of the flow to the suction side of the conveying means occurs at an angle so that drawn-in and recirculated product-parts collide, and whereby the collision decelerates any possible rotating movement inside the suction channel. This causes a suppression of the rotating movement inside the fluid, thereby avoiding any possible over-concentrations and in-homogeneities inside the product. Moreover, the partial recirculation ensures better intermixing of the product before the feed stream reaches the dispersion machine.

After the processing of the fluid in the dispersion machine it often contains at least in part size-reduced drops or particles that are not sufficiently stabilized yet and therefore tend to re-coalesce and/or re-aggregate. In order to avoid this from occurring it is advantageous to be able to maintain turbulent flow conditions even after the flow leaves the rotor-stator dispersion machine so as to prevent the particles from being relatively close to each other in a laminar flow; instead, they are only exposed to relatively brief collisions. Coalescence and/or aggregation are, moreover, promoted in areas where the flowing fluid is subject to a dynamic pressure.

Conventional dispersion machines often use a pipe as an outlet channel from the rotor-stator dispersion machine. A comparison of the exit areas of the toothed ring of the outer stator with the cross-sectional area of the pipe reveals that the cross-sectional area is considerably smaller. The total radial discharge of fluid through the toothed ring of the outer stator must pass through this small opening, which means the fluid must in part travel long distances and is exposed therein to areas having different flow rates as well as to zones having low movement with high dynamic pressures. An outlet channel of this type, which is in the shape of a relatively thin pipe, can be viewed as a sudden narrowing.

Based on fundamental principles for the definition of turbulent and laminar flows by Reynolds, which provide that the total resistance inside a flowing fluid is the sum of the frictional resistance and the pressure drop resistance, the inventor has developed the following measures for minimizing the total resistance.

The fictional resistance is to be minimized by providing, as much as possible, a laminar boundary layer. Gradual transitions are envisioned to this end in the geometric configuration of the flow-conveying components.

The pressure drop resistance in the case of the circum-flow of a body is to be reduced by providing that the point of disengagement is shifted as far possible to the rear of the body.

Both influences overlap.

The transition from laminar to turbulent flow conditions can be characterized for different types of flows by indicating the Reynolds number Re. According to the model concept by Reynolds, a laminar flow becomes unstable to disturbances at higher Re numbers such as, for example, oscillations and vibrations, which are always present in nature and technology. Such small disturbances can influence and in fact cause the switch-over from a laminar to a turbulent flow. Regarding the flow-through of a pipe having a circular cross-section this switch-over occurs at approximately Re=2300. The more violent these disturbances, the lower the Reynolds number when the laminar flow switches over to a turbulent flow.

The invention therefore envisions that the outlet channel or outlet channels are configured in such a way that a large, gradual, continual transition be provided from the outer toothed ring in the rotor-stator system toward the line that leads away the fluid, for example the recirculation line, in order to minimize dynamic pressures. This goal is achieved by a large-area outlet channel. Vibrations are created at the large-area top and bottom sides of the outlet channel, which means at its flat sides, due to the high flow rates that support the turbulent flow.

The invention thus provides an outlet apparatus for connecting a rotor-stator dispersion machine comprising a rotor-stator system having at least one toothed ring, a discharge apparatus, in particular a tube line, for discharging the fluid from the rotor-stator dispersion machine, and wherein the outlet apparatus comprises at least one outlet channel having a first opening for the connection with the outside housing of the rotor-stator dispersion machine inside an area surrounding the rotor-stator system and having a second opening for the connection with the discharge apparatus. The first opening has a rectangular cross-section. The second opening has a smaller cross-sectional area than the first opening, whereby cone-shaped tapering is achieved over the length of the discharge apparatus between the first and the second openings.

In an advantageous improvement of the invention the length $L_{aus}$ of the outlet channel corresponds at least to the largest width of the rectangular first opening. This results in an especially long, flat outlet channel with a gradual transition into the discharge apparatus. To be able to easily connect the outlet apparatus to a pipe the invention further envisions that the second opening is circular.

In an advantageous improvement of the invention the connection measure of the first opening is adjusted to the area through which the fluid passes when it leaves the rotor-stator system in order to be able to take over and transport the flow from the rotor-stator system to the outlet apparatus, essentially without the flow having to pass through any widening or narrowing. To this end the outlet apparatus is configured in such a way that the sum of the cross-sectional areas of the first opening of all outlet channels corresponds essentially to the total free area between the teeth of the toothed ring that is located adjacent to the first opening when the outlet apparatus is connected to the rotor-stator dispersion machine.

Even if the flow guidance according to the invention is visibly improved in comparison to the prior art, when using one outlet channel it may at times still be difficult to ensure a turbulent flow through the entire installation with the rotor-stator dispersion machine. Consequently, another considerable improvement is therefore an outlet apparatus with several outlet channels. Even with a so-called "dual outlet channel," which means one outlet apparatus having two outlet channels, it is possible to maintain the turbulent flow during operation more reliably. A so-called "Quadro outlet channel," which means an outlet apparatus having four outlet channels, has proved especially advantageous. Especially the contour of having four outlet channels, which is described in more detail below, helps to keep the dynamic pressures acting on the walls and transitions relatively low. A Reynolds number of Re=10.000 can thus be maintained.

An advantageous improvement of the invention provides for an outlet apparatus where the transition from the lateral area of one outlet channel to the lateral area of the neighboring outlet channel describes the shape of an arc. The desired gradual transition of the flow-carrying components from one into the other is further supported if according to another embodied example of the invention the first opening of each of the outlet channels is dimensioned in such a way that each outlet channel essentially transitions directly into the neighboring outlet channel.

For a flexible utilization of the outlet apparatus that allows for processing different material systems and in order to provide for the possibility, in particular, of so-called "late product differentiation" (LPD) an advantageous improvement according to the invention envisions that at least one outlet channel comprises a feed apparatus for adding ingredients in solid, powdered and/or liquid form to the fluid, which flows out of the rotor-stator dispersion machine through the outlet channel during operation.

Using the individual measures as provided in context of the invention simplifies the production of stable, fine-particulate dispersions by optimizing how the flow is directed through an entire installation comprising a premix container, rotor-stator dispersion machine and circulation line and/or discharge apparatus for maintaining turbulent flow conditions. The invention provides an inlet pipe connection in order to evenly recirculate the product from the rotor-stator dispersion machine to the container and with the fluid inside the container, while disrupting the flow conditions as little as possible.

The inlet pipe connection is configured for adding fluid to a container; wherein the container is envisioned for providing the fluid for a processing action inside a rotor-stator dispersion machine and has a longitudinal axis and a container wall with a container wall opening. The inlet pipe connection comprises an inlet opening that is to be connected with the container wall opening and a feed opening that is to be connected with a feed line. Furthermore, the inlet pipe connection comprises a tube line that extends essentially between the feed opening and the inflow opening. The tube line has, at least in some sections, an inclined longitudinal axis with regard to the plumb line relative to the longitudinal axis of the container, and wherein the incline is at an angle in the range of 0° to 180°, preferably an angle in the range of 30° to 150°, and especially preferably at an angle in the range of 90° to 120°.

An advantageous improvement according to the invention provides that the longitudinal axis of the tube line encloses an angle of $a_{100}$ (alpha__100) with the plumb line relative to the longitudinal axis of the container, and wherein the inlet pipe connection is provided for the connection with a container that is at an angle of $a_{Konus}$ along the tapered container floor toward the outlet, which is in contact with the container wall opening. The value of the angle $a_{100}$ therein is $a_{100}=90°$ to $90°+½\, a_{Konus}$.

To be able to adjust the desired defined flow conditions it suffices according to the invention to provide an inlet pipe connection having a pipe length $L_{Ein}$ that is a value in the range of the twice to six times the diameter of the feed opening.

To allow for an even distribution of the product that is recirculated to the container during operation and over an area that is as large as possible a further embodied example according to the invention envisions that the area of the tube line that opens into the feed opening has a contour that widens in the direction of the feed opening. It has proved advantageous in this context if the area of the tube line that opens into the inlet opening has a contour that widens in the direction of the inlet opening in the shape of a circular arc having a radius $R_1$, and wherein it is preferred for the radius $R_1$ to be at least one half of the diameter $D_1$ of the container.

An installation system for producing dispersions containing at least one fluid comprising a container, a rotor-stator dispersion machine and a discharge apparatus as well as an intermediate piece for the connection of the rotor-stator dispersion machine with the container and/or an outlet apparatus for the connection of the rotor-stator dispersion machine with the discharge apparatus and/or an inlet pipe connection for adding fluid to the container offers an opportunity for utilizing one or several of the aspects according to the invention.

BRIEF DESCRIPTION OF THE DRAWINGS

Subsequently, the invention will be illustrated in further detail referring to the enclosed drawings. Identical components are identified by the same reference sign. Shown are in:

FIG. 13 a schematic representation, seen in a top view and a sectional view, of an inlet pipe (FIG. 13A);
   a schematic representation, seen in a lateral view, of a connection of an inlet pipe according to a further embodied example of the invention (FIG. 13B);
   a schematic representation, seen in a top view, of an inlet pipe according to a further embodied example of the invention (FIG. 13C);

DETAILED DESCRIPTION

System installations as set forth by way of some typical examples in FIG. 1 are often used in the production of dispersions that contain at least one fluid. The installations comprise a container 1, which contains at least one fluid, a dispersion machine 4 and a recirculation line 10 that returns the fluid to container 1 after the fluid was processed inside the dispersion machine 4. The basic configuration of an installation is shown in FIG. 1A.

Figure 1C:
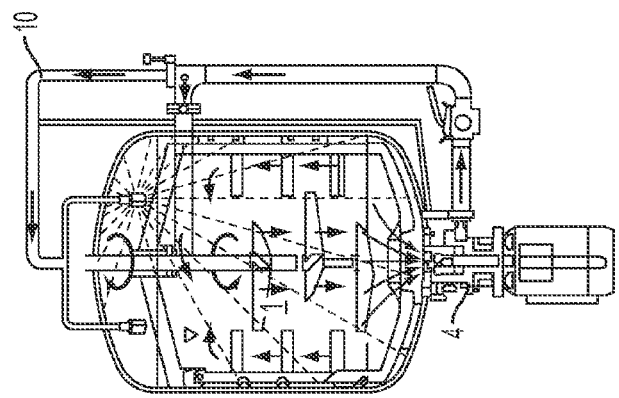
FIG. 1 schematic representations 1A, 1B, 1C, 1D and 1E of systems according to the prior art.
Figure 1B:
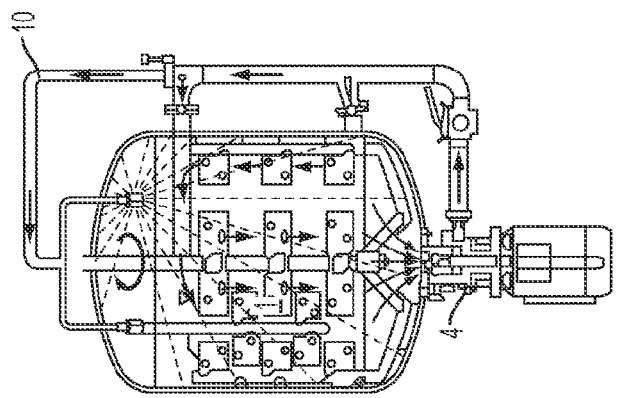

It is possible to use a scraping agitator in order to improve the intermixing of the fluids in container 1 (see FIG. 1B). Furthermore, to support the intermixing of the fluid in container 1, it is possible to employ double-motion agitators, as shown in FIG. 1C. The dispersion machine 4 is connected at the container floor of container 1 and draws the product from container 1 pumping it via the recirculation line 10, which is located outside of the container 1, back into the container. The product can be recirculated into the container, as shown in the respective FIG. 1 above, from above the fluid level.

On the other hand, the product can also be recirculated to the container 1 from below the fluid level, as demonstrated by the lines in FIG. 1 that extend laterally of the recirculation line 10 into the container 1. The dispersion machine 4, which is mounted below container 1, is configured for the production of flowable materials, such as, for example, emulsions or suspensions. In what follows below these will be designated by the terms "dispersion" or "fluid" and in part also "product."

Figure 1A:
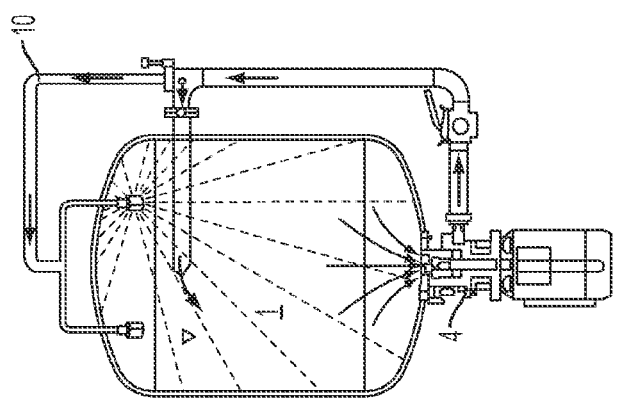
Figure 1E:
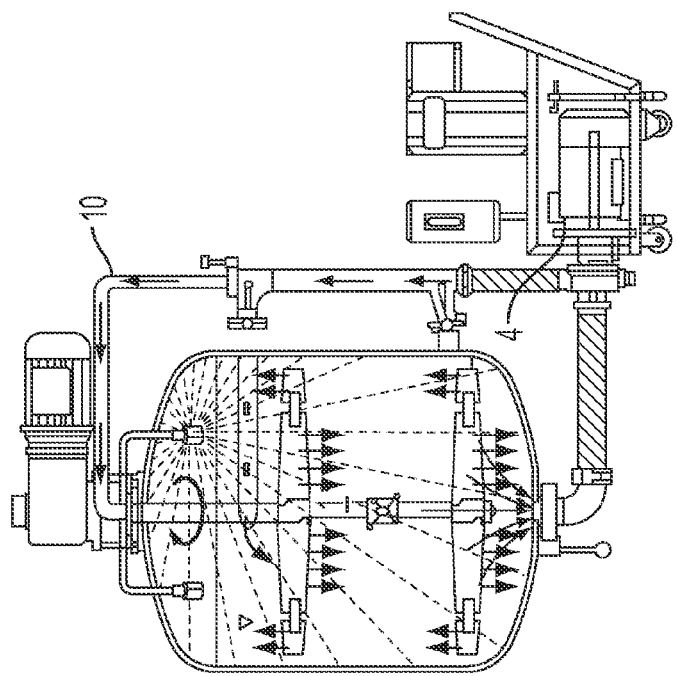
Figure 1D:
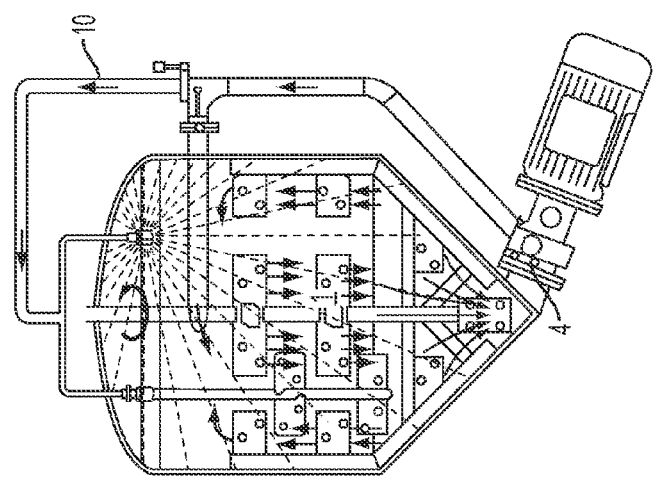

In the installations that are depicted in the FIGS. 1A to 1C the rotor-stator dispersion machine is disposed coaxially relative to the longitudinal axis of the container 1. FIG. 1D demonstrates a solution from the prior art in which the rotor-stator dispersion machine 4 is disposed at an angle of inclination of more than 90° to 120° relative to the longitudinal axis of the container 1. This configuration creates major problems due to bending stresses within the dispersion machine. But the rotating movement of the fluid that the fluid brings with it when transitioning from the container into the rotor-stator dispersion machine is only throttled slightly. FIG. 1E shows a rotor-status dispersion machine that is disposed at an angle of 90° relative to the longitudinal axis of container 1. But, due to the fact that the fluid is redirected in this configuration, this solution as set forth in this example from the prior art suffers from the disadvantage of reduced suction power by the rotor-stator dispersion machine 4.

However, especially rotor-stator dispersion machines with high suction power tend to set the fluid that is drawn from the container 1 into a rotating motion, which reduces the dispersion performance. For an emulsion this means, for example, a broader drop-size distribution. Regarding lower fluid levels in container 1, these conditions will result in the formation of vortices that will in an undesired fashion also draw air into the product. The intermediate piece 2 according to the invention serves to prevent this disadvantageous fluid rotation during the transition from container 1 to the rotor-stator dispersion machine 4.

Figure 2:
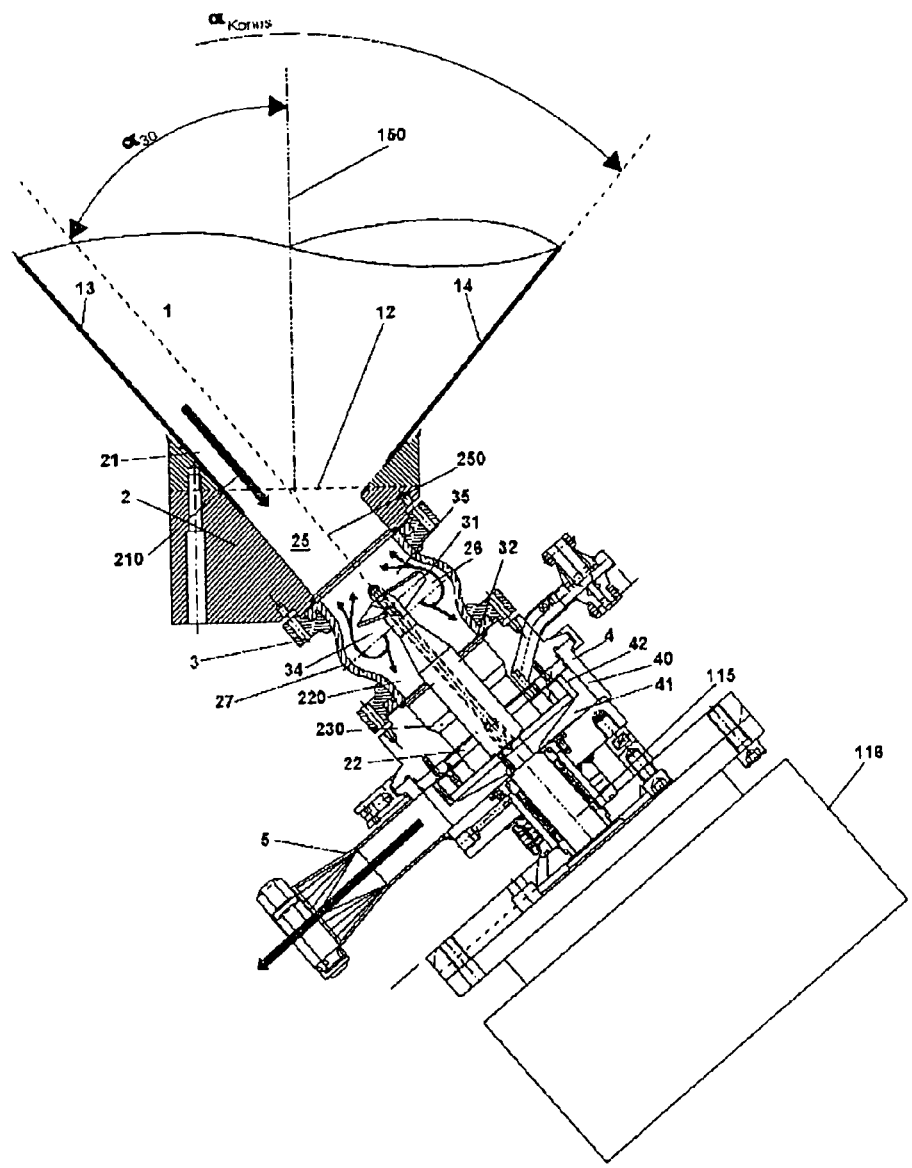
FIG. 2 a schematic representation, seen in a cross-section, of an intermediate piece that is connected with a container and a rotor-stator dispersion machine according to a first embodied example of the invention.

FIG. 2 shows an apparatus according to a first embodied example according to the invention in which an intermediate piece 2 is disposed at the location of the transition of container 1 and the rotor-stator dispersion machine 4. The rotor-stator dispersion machine 4 comprises a housing 40 inside which a rotor 41 and a stator 42 are coaxially disposed relative to each other. The rotor 41 is rotably supported on a shaft 115 and can be driven by a motor 116. The container 1 transitions in the area of the container floor 14 into the outlet 12 of the container. The intermediate piece 2 is connected with the container in the area 13, which is the container wall that is adjacent to the container wall of floor 14 of outlet 12, as indicated in FIG. 2 by the flange connection.

The intermediate piece 2 has an opening 21 for the connection with the outlet of the container 1. The intermediate piece has a further opening 22 by which the intermediate piece 2 can be connected with the rotor-stator dispersion machine 4. During operation fluid is drawn from the container 1 through the outlet of container 2 and into the opening 21 of the intermediate piece 2. The fluid passes through the intermediate piece 2 through its tube line 25 and enters the dispersion machine 4 through the opening 22. The fluid travels through the rotor 41 and the stator 42 of the dispersion machine 4 and exits the dispersion machine through an outlet apparatus 5.

Tube line 25 of the intermediate piece 2 has a longitudinal axis 250 that is inclined relative to the longitudinal axis 150 of the container 1 by the angle $a_{30}$. The angle $a_{30}$ can be selected in the range of below 90°. It is expedient for the angle $a_{30}$ to be in the range between approximately between 20° and approximately 60°. In an especially preferred embodiment the intermediate piece 2 is provided for the connection of a dispersion machine 4 with a container 1 having a container floor 14 that is tapered toward the outlet 12 at an angle of $a_{Konus}$. If the angle $a_{30}$ is one half of the angle $a_{Konus}$, during operation, the fluid from container 1 enters the tube line 25 of the intermediate piece 2 directly over the conical floor and is fed at the angle of the intermediate piece into the dispersion machine. Feeding the product directly over the tapered floor into the dispersion machine, due to the installation angle $a_{30}$ of the intermediate piece 2, results in an especially efficient suppression of the rotational movement of the fluid inside the container before the fluid enters the dispersion machine 4.

In the preferred embodied example according to the invention that is shown in FIG. 2 the intermediate piece 2 is configured in two parts comprising a first part 210 and a second part 220. The parts 210 and 220 can be integral components of the intermediate piece 2 according to the invention. But in order to achieve better flexibility part 220 is, as shown in FIG. 2, configured as a separate component of the intermediate piece 2 and can be connected to part 210 by way of a flange connection. The intermediate piece 2 assumes a double function in the preferred embodied example as shown in FIG. 2. On the on hand, the fluid is redirected by the angle $a_{30}$ before it enters the dispersion machine and, on the other hand, using an agitator 31, the fluid can be accelerated before it enters the dispersion machine 4.

The agitator 31 comprises, for example, a propeller-type agitator blade 3 and is connected by its shaft 32 with rotor 41. During operation the agitator 31 can be driven by a motor 116. Using the agitator, the fluid, which is fed from the container 1 and the tube line 25 of the intermediate piece into the dispersion machine 4, is accelerated in the direction of the dispersion machine. Due to the suppression of the rotary motion, which the fluid could bring along with it from the container 1, inside the tube line 25 of the intermediate piece 2, it is possible to support optimum pumping action of the dispersion machine.

This action according to the invention is improved further by the intermediate piece 2 defining a chamber 26 for receiving the agitator blade 3, and wherein the chamber 26 is delimited toward the outside by the arching of the wall of the intermediate piece, as seen from the longitudinal axis 250 of the latter. If the second part 220 of the intermediate piece 2 is constituted as a flexible element, such as a rubber bellows 27, due to this two-part configuration of the intermediate piece 2, it is possible to achieve an especially easy and at the same time robust construction of the intermediate piece 2.

The rubber bellows 27 has a pre-shaped bulged structure (compare FIG. 2) and thereby forms the chamber 26 in which the agitator blade 3 of the agitator 31 can be disposed. The arching in the area of the chamber is dimensioned approximately in such a way that an annular gap is configured between the outer delimitation of the agitator blade 3 and the adjacent interior wall of the rubber bellows 27 having a width of a maximum of approximately one quarter of the diameter of the tube line 25 outside of the chamber 26, which means in the area where there is no wall arching.

With this construction, agitator blade 3 is used for feeding a volume stream $V_{propeller}$ (V_punkt_Propeller) from container 1, when the agitator 31 of the rotor-stator dispersion machine 4 is operated. The dispersion machine 4 has a conveying power of $V_{RS}$ (V_punkt_RS). The propeller is configured in such a way that the volume flow $V_{propeller}$ is larger than the conveying power $V_{RS}$. This means a portion of the fluid that is fed in by the agitator of the dispersion machine does not flow though the dispersion machine during operation but is recirculated from the pressure side 34 of the conveying means 3 to the suction side 35.

For especially efficient directing of the flow it is advantageous to guide the occurring partial streams, as much as possible in a directed fashion, especially inside the intermediate piece 2. In order to avoid, to this end, the radial outward release of fluid from the agitator blade 3 and thereby any remixing of this outwardly released product with fluid that passes by the dispersion machine 4 and the agitator blade 3 and is not taken up and therefore recirculated, the agitator blade is equipped with a sleeve 33. This ensures that fluid, conveyed in the area that is enveloped by the sleeve, is conveyed from the agitator blade to the pressure side and therefore toward the dispersion machine and fed to the dispersion machine as a targeted defined partial stream.

Simultaneously, the sleeve forms the inside wall of the above-described annular channel in the chamber 26 between the outside wall of the chamber and the agitator blade 3. On the inside toward the longitudinal axis 250 of the tube line 25 the annular channel is thus delimited by the sleeve and constitutes a defined area for the fluid that is recirculated from the pressure side 34 to the suction side 35 of the agitator blade 3. On the suction side 35 the recirculated fluid collides with the suctioned fluid, whereby the collision of the corresponding product streams contributes further to preventing a rotation of the fluid when it exits the container.

Figure 3:
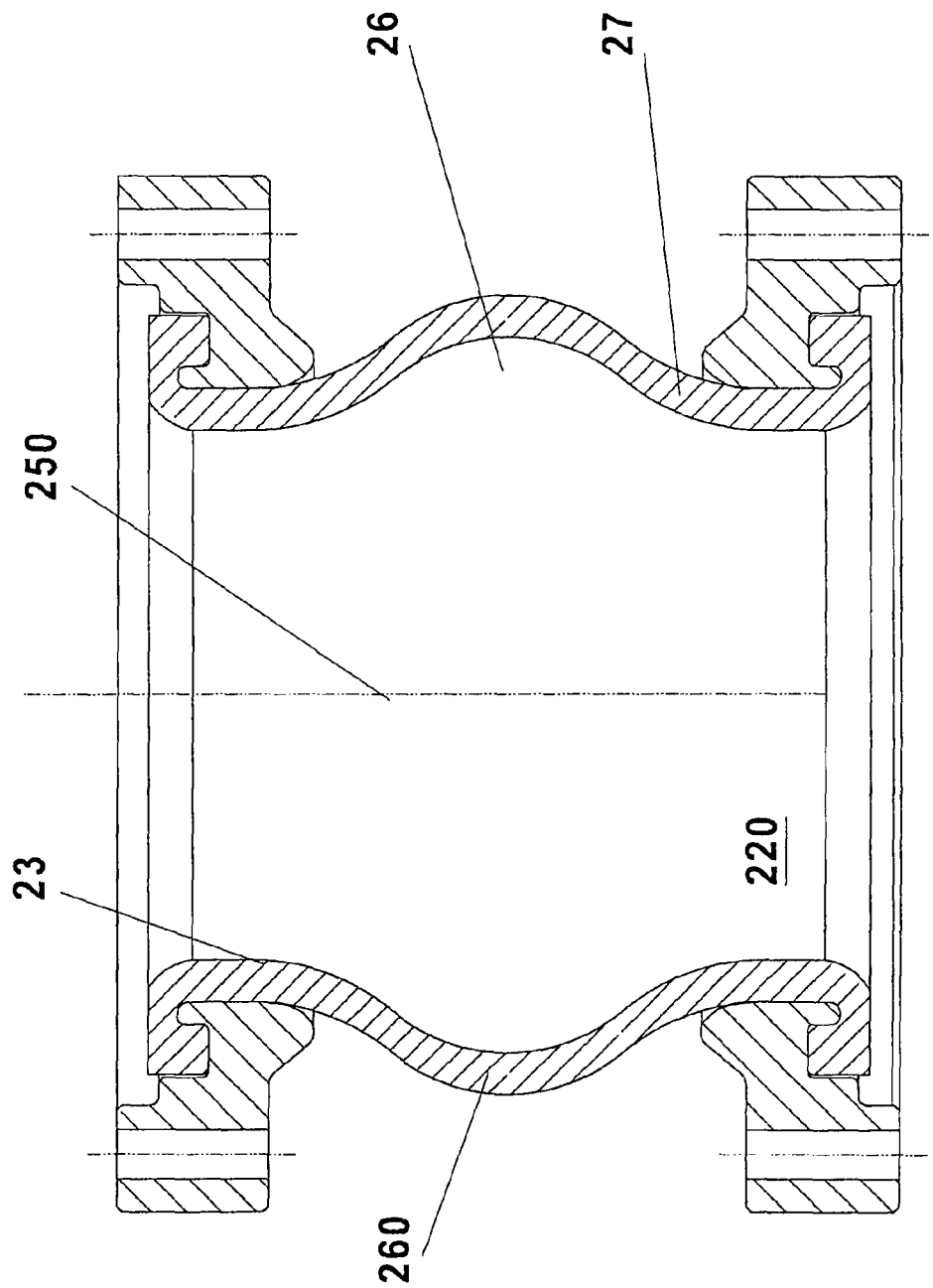
FIG. 3 a schematic representation, seen in a cross-section, of a part of an intermediate piece according to a further embodied example of the invention.

FIG. 3 is a representation of the second part 220 of the intermediate piece 2. A rubber bellows 27 constitutes the wall 23 of the pipe of the intermediate piece in its second part 220. At both of its ends, the rubber bellows 27 has a lip that, seen from the longitudinal axis 250 of the part 220, is folded to the outside. The lip engages with a correspondingly configured connection ring; and it is possible to connect the part 220 thereto, in the way of a flange connection, and with the first part 210 of the intermediate piece and/or with the housing 40 of the dispersion machine. In its middle area 260 the rubber bellows has a convex configuration. Correspondingly, the rubber bellows 27 has a bulge that defines a chamber 26.

Figure 4:
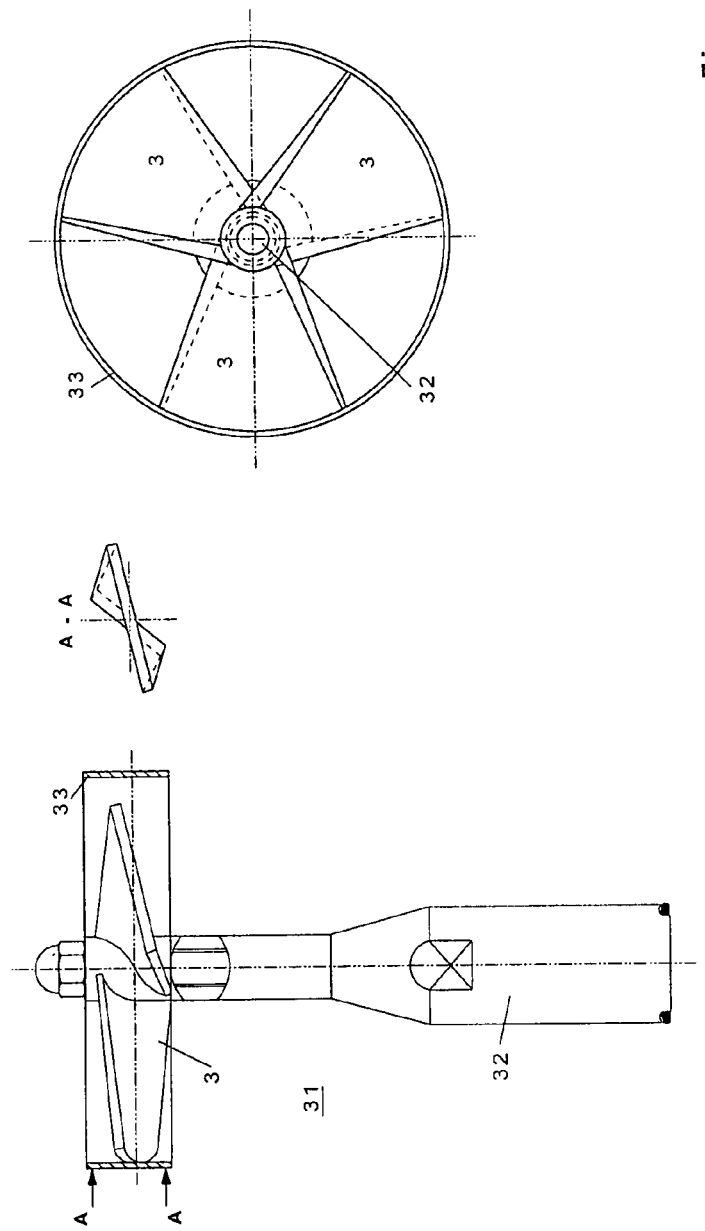
FIG. 4 a front view, top view and sectional view of a conveying means according to the invention.

A conveying means 3, in particular an agitator blade, can be disposed inside the chamber 26. FIG. 4 shows a corresponding conveying means. The agitator 31 comprises a shaft 32. By the shaft 32 it is possible to connect the agitator 31 with the rotor 41 or the drive shaft 115 of the rotor-stator dispersion machine 4 (not shown in FIG. 4). The agitator 31 comprises an agitator blade 3 that defines a propeller-type agitator. The agitator blade 3 is connected to a sleeve 33 at its outer ends. The sleeve 33 thus forms a jacket for the agitator blade 3. During operation the sleeve acts as a guide sleeve for fluid that is guided from the pressure side of the agitator blade, which is located in FIG. 4 below the agitator blade 3, by the outside of the sleeve 33 to the suction side, which is located in FIG. 4 above the agitator blade 3, as well as through the sleeve 33 for the fluid that is to be guided from the suction side on the pressure side passing the agitator blade.

Due to the especially configured conveying means 3 with a propeller-type agitator inside a guide sleeve that is placed inside a flexible element such as a rubber bellows, and wherein the rubber bellows has a convex shape, the invention allows for achieving a visible improvement of the suction conditions relative to the used rotor-stator dispersion system. By suppressing the rotational movement of the fluid inside the intermediate piece 2 it is possible to achieve optimum pumping action. Drawing through the propeller-type agitator with ring sleeve results in achieving radial release of fluid from the agitator blade, on the one hand, and in, on the other hand, improved recirculation of fluid from the pressure side to the suction side of the agitator.

Using the propeller-type agitator it is possible to draw a volume flow $V_{propeller}$ that is larger by a factor 2 to 3 than the throughput $V_{RS}$. This results in a recirculation of the excess volume flow $\Delta V$ to the suction side of the propeller. This recirculated volume flow is returned at an angle in the suction channel that is constituted by the tube line 25 in the intermediate piece 2, whereby a collision is achieved between the drawn and the recirculated product. This collision causes a strong deceleration of the rotational movement that is generated by the high speed of the propeller. A part of the recirculated volume flow is thus returned to the propeller at slight overpressure. This, furthermore, promotes the intermixing of the product, before the product reaches the rotor-stator system. In place of a propeller-type agitator, within the scope of the present invention it is possible to use any other type of agitator blade geometry that the person skilled in the art may consider especially suitable for use in connection with the product to be processed.

According to the invention the recirculation of the excess volume $\Delta V$ to the suction side of the propeller is possible due to the interaction of the agitator blade with a sleeve because the radial release from the agitator is prevented, due to the geometry of the flexible element (compare FIG. 3) and the connection angle of the rotor-stator dispersion machine am via the intermediate piece with at least one area of a parallel connection relative to container wall 13 adjacent to the outlet 12.

During operation, when the rotor-stator dispersion machine is connected to the container, the fluid in the area of the tapered container floor is additionally intermixed. This additional intermixing is especially pronounced if as little as possible or no additional fluid at all is added to the fluid that is located inside in the cone. As will be explained below in FIG. 14, these conditions are achieved by a strong throttling or complete interruption by way of valve 9 of the recirculation of the product that is removed from the dispersion machine 4 via the outlet apparatus 5 (compare FIG. 2) in order to be returned to container 1 via the recirculation line 10 (see FIG. 14).

The above explanations describe, among other things, how, assisted by the invention, it is possible to suppress the rotation of the fluid in the area of the transition out of container 1. If an intermediate piece 2 with a conveying means 3 is used, due to the rotational motion of the agitator, there exists the risk that the fluid is set in a rotational motion also in the transitional area from the pressure side of the conveying means 3 toward to the dispersion machine 4, whereby the suction power of the dispersion machine 4 will be reduced. To avoid this risk the invention provides for at least one flow disrupter in the intermediate piece that is disposed before the dispersion chamber of the rotor-stator dispersion machine 4. The dispersion chamber is defined by the rotor 41 and the stator 42 of the dispersion machine 4.

Figure 5:
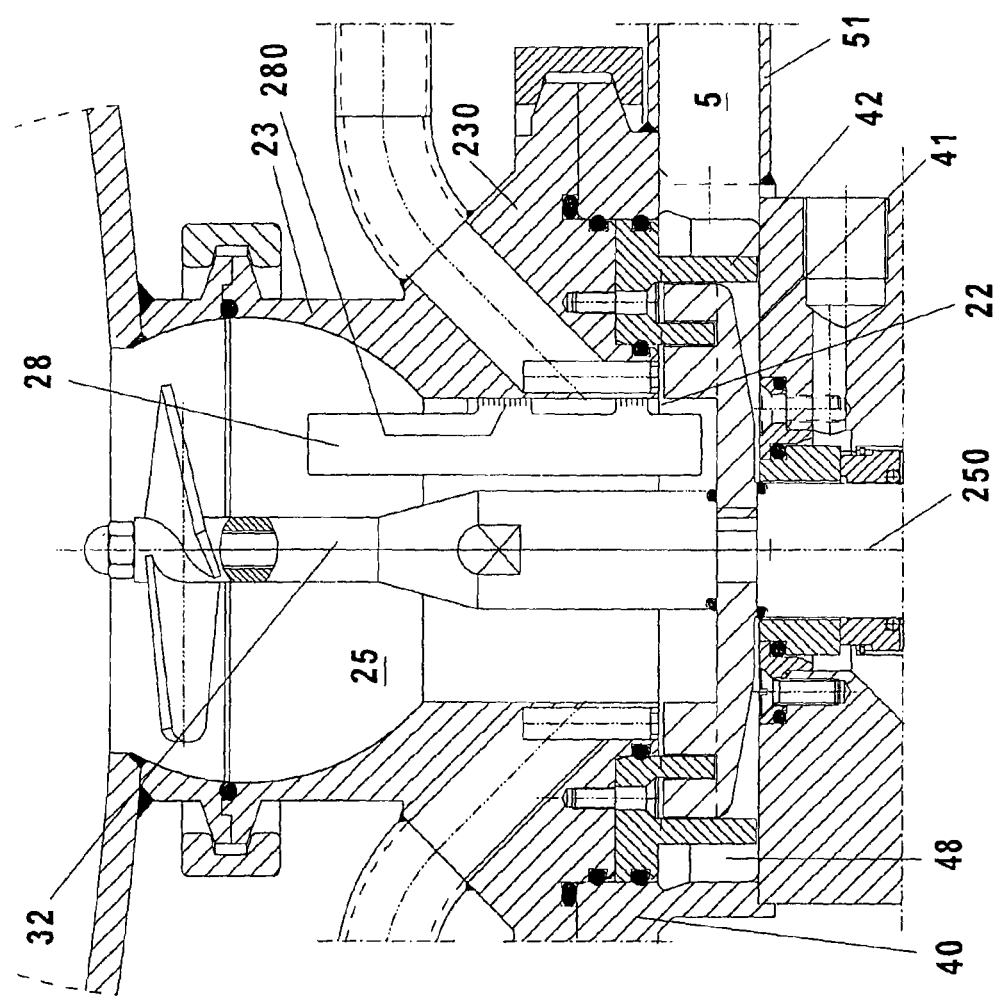
FIG. 5 a schematic representation, seen in a cross-section, of an intermediate piece that is connected with the container and a rotor-stator dispersion machine according to a further embodied example of the invention.

FIG. 5 shows the corresponding apparatus with a flow disrupter 28. On the suction side of the rotor-stator dispersion machine, during operation, fluid is supplied to the dispersion chamber with the aid of the agitator 31 via the tube line 25 of the intermediate piece; the shaft 32 of said agitator is shown in FIG. 4. At least one flow disrupter 28 is disposed in this area. The flow disrupter 28 comprises a longitudinal element that is arranged along the longitudinal axis 250 of the tube line 25, for example a sheet metal. This sheet metal is disposed in a radial position relative to the longitudinal axis 250 inside the tube line 25 and connected to the wall 23 of tube line 25, for example by a screwed connection 280.

Also conceivable as a holding apparatus for the flow disrupter, aside from wall 23, is any other stationary, which means non-rotating, component of the dispersion machine 4. For example, the flow disrupter 28 can also mesh by its outside thread with an inside thread that is provided on a flange, which in turn is envisioned for fastening the intermediate piece 2 on the housing of the dispersion machine 4. In the embodied example according to the invention that is depicted in FIG. 5 (compare also FIG. 2) this is a third part 230 of the intermediate piece 2.

Part 230 is located directly in front of the second opening 22 of the intermediate piece through which, during operation, fluid enters the dispersion machine 4 from the intermediate piece 2. The flow disrupters 28, which the person skilled in the art also refers to as baffle plates, are brought in very close proximity to the rotor 42 in order to prevent any rotational movement when the product is taken from the tube line 25 into the dispersion chamber of the rotor-stator system. During operation strong turbulence occurs in the fluid between the flow disrupters 28 and the inner side of the inner toothed ring of the rotor that is directed toward the longitudinal axis 250, when the inner toothed ring passes by the flow disrupters. This further improves the intermixing of the product. The intermediate piece 2 and specifically the part 230 together with the flow disrupters 28 can be used in combination with the most varied rotor tooth geometries.

Figure 6:
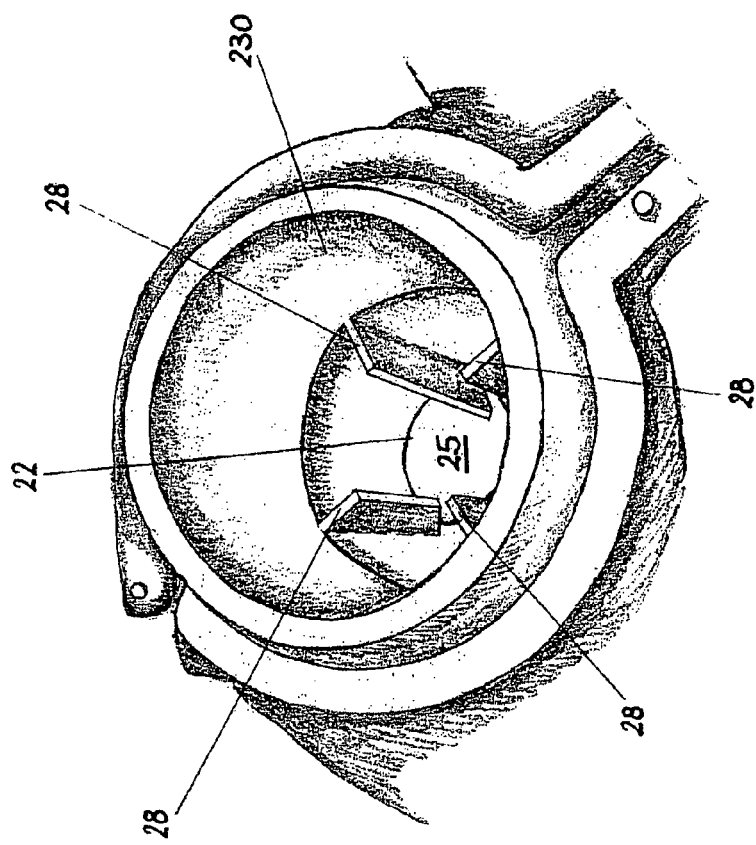
FIG. 6 a photograph of an inside view of the part of an intermediate piece comprising a flow disrupter according to a further embodied example of the invention.

In the depiction in FIG. 5 three flow disrupters 28 are disposed evenly distributed around the longitudinal axis 250. FIG. 6 shows a further embodied example according to the invention for the intermediate part 2 inside a part 230. Four flow disrupters 28 are disposed inside a tube line 25. During operation, the fluid flows through the part 230; in the embodied example in FIG. 6 the direction of flow is into the plane of the present page. Before the fluid enters the dispersion machine 4 through opening 22, it passes by the flow disrupters 28. Any possible rotational movement of the fluid that can be caused by the rotation of the agitator 31 (compare FIG. 2) can thus be interrupted by the flow disrupters 28.

By redirecting the flow of the fluid that leaves the container 1 with the aid of the intermediate piece 2 and its inclination by the angle $a_{30}$ relative to the longitudinal axis of the container, as well as the use of the flexible element 27 with the bulge for the formation of a chamber 26, which can have a conveying means 3 disposed therein, and finally by the flow disrupter 28 the invention provides means that are capable of preventing a rotation of the fluid immediately before the fluid enters the rotor-stator dispersion machine 4. This has the added advantage that any formation of electrostatic charges in the product can be avoided that may, in particular, have an uncontrollable influence on the action of the emulsifiers. Such build-up of static charges of the product is caused by the friction between the product and the housing of the dispersion machine. A rotation of the product causes additional friction between the product and the housing.

To avoid cavitations in the fluid inside the dispersion chamber during the operation of the rotor-stator dispersion machine and/or the coalescence of drops or aggregation of particles of the dispersion that is conveyed through the dispersion machine it is necessary for the flow rate of the fluid, and thereby also the pressure inside the dispersion chamber to increase through the dispersion chamber after entry and passage of opening 22 of the intermediate piece 2 until the point of exit, which means from the inside to the outside. To this end it is advantageous if a stator 42 is used together with the intermediate piece 2, as described above, for the dispersion chamber of the rotor-stator dispersion machine 4 in which the flow-transfer area becomes smaller from the inside to the outside.

Figure 7:
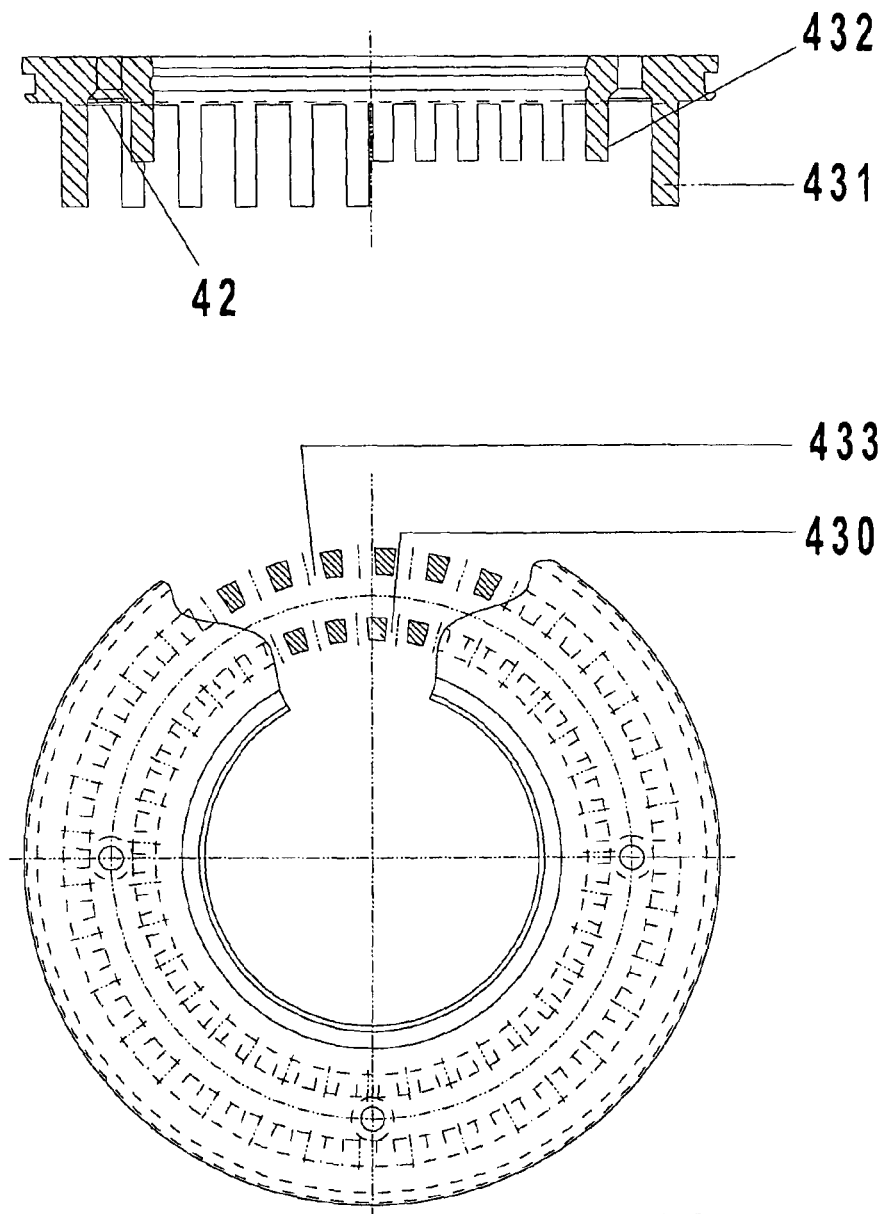
FIG. 7 a schematic representation, seen in a cross-section and partial sectional top view, of a stator for a rotor-stator dispersion machine, specifically for use in combination with an outlet apparatus according to the invention.

FIG. 7 shows an example of a stator 42 of this type having two toothed rings 431 and 432. The flow transfer area 433 between the teeth of the outer toothed ring 431 is smaller than the flow transfer area 430 between the teeth 432 of the inner toothed ring. The outer flow transfer area 433 can be smaller by a factor of between 10 and 30 percent than the inner flow transfer area 430, and wherein the exact value depends on the geometry and the number of teeth of the outer toothed ring of the stator. The reduction of the transfer area can be achieved by two measures.

On the one hand, while maintaining an equal number of openings, the openings can be configured narrower. But the ratio of the width of the opening relative to the depth of the opening, which is approximately 1:1, should be maintained in order to avoid any additional increase of the pressure loss during the transfer of the fluid through the teeth of the outer toothed ring. In comparable machines this ratio ranges approximately from 1:3 to 1:4. In this context, the depth is measured radially relative to the longitudinal axis of the stator. On the other hand, the housing 40 of the rotor-stator dispersion machine can be configured correspondingly in the area that is directed toward the dispersion chamber.

Figure 8:
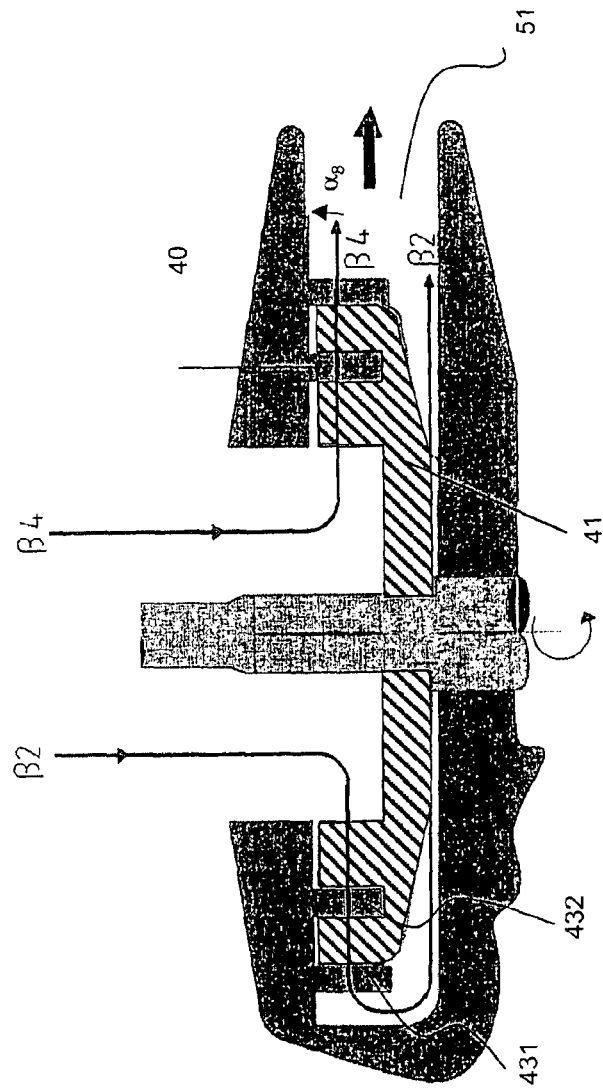
FIG. 8 a sketch of a rotor-stator system, seen in a cross-section, to illustrate a model concept for the flow.

To demonstrate FIG. 8 shows a schematic depiction of the dispersion chamber with the rotor 41 as well as the inner and outer toothed rings 431, 432 of the stator. The upper part of the area of housing 40 that is directed toward the dispersion chamber is, viewed from the longitudinal axis of the rotor, sloped from the inside to the outside in such a way that the height of the flow transfer openings of the outer toothed ring of the stator is reduced. In the representation as shown in FIG. 8 this slope is characterized by angle $a_8$. The advantage of this measure lies in the fact that the product stream during the flow through the dispersion chamber is accelerated both radially as well as axially, which improves the intermixing inside the outlet channel following after the dispersion chamber. The fluid reaches this outlet channel by the first opening 51 of the outlet channel that is marked in FIG. 8.

After generating very fine particles in the dispersion chamber of the rotor-stator system it is important for these particles to be stabilized. Especially for emulsions it has been shown that stabilization in turbulent flow helps prevent the coalescing of the droplets. The scope of the invention therefore also provides for an outlet apparatus that allows for maintaining a turbulent product flow for the entire area between the outer tooth ring of the stator and the neighboring housing 40 of the dispersion machine, which transitions into the outlet apparatus. Consequently, the outlet apparatus is configured in such a way that a large gradual, continual transition is provided for the fluid after it has passed the outer toothed ring of the stator and toward the discharge apparatus from the rotor-stator dispersion machine. This way it is possible, in particular, to minimize high dynamic pressures.

This is achieved by a large-area outlet channel. Due to the high flow rate of the fluid during operation, oscillations and vibrations occur at the large-area upper and lower sides of this outlet channel, which is its flat side, in support of the turbulent flow. The configuration of the outlet apparatus according to the invention with the special geometry of the outlet channel is based on the knowledge that the fluid, before reaching the outlet apparatus, passed the dispersion chamber in partial flows with different histories of their passage. These partial flows will subsequently be referred to as partial flows $\beta 1$, $\beta 2$, $\beta 3$ and $\beta 4$.

Figure 9:
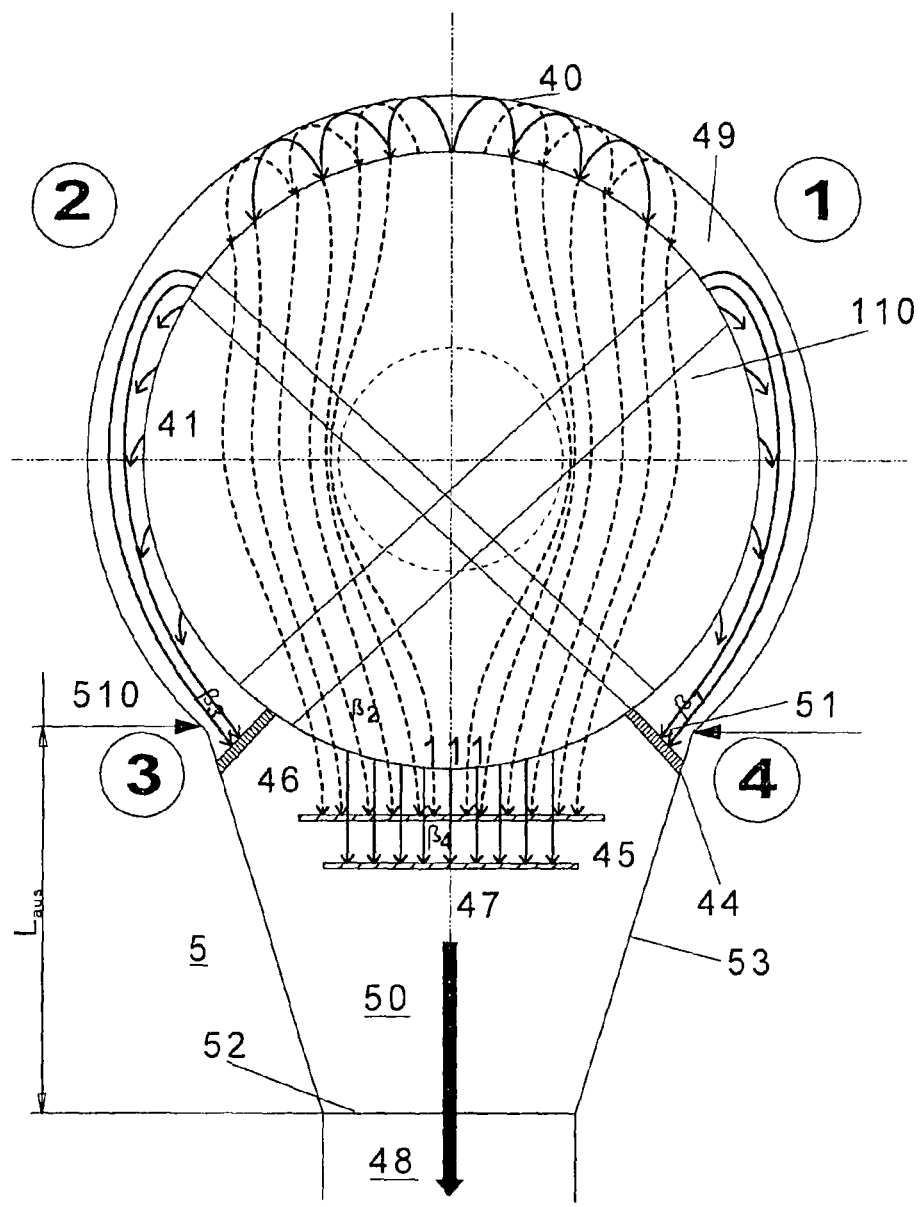
FIG. 9 a schematic representation, seen from the top with a model concept for the flow, of an outlet apparatus that is connected with a rotor-stator dispersion machine.

The paths of these partial flows are schematically represented in FIGS. 8 and 9. A first partial flow β2 leaves the dispersion chamber of the rotor-stator system and is conveyed, starting at the side that is opposite to the outlet channel, toward the opening 51 along the underside of the rotor 41 to the outlet channel. The partial flow β2 is accelerated therein by the rotational movement of the rotor 41. This additional acceleration correlates with the fact that the partial flow β2 must travel the longest distance of all the considered partial flows, which is why partial flow 32 encounters the largest pressure loss.

We must stress the fact that the explanations regarding the partial flows β1 to β4 and their paths toward the outlet channel are a model concept; this model has proved an expedient vehicle for explaining the basic idea for configuring the outlet apparatus according to the invention. A second partial flow β4 is conveyed directly toward the opening 51 into the outlet channel, after having passed through the dispersion chamber. This partial flow β4 undergoes the lowest pressure losses because it is not redirected as the other flows. To deal with this low pressure loss as well as equalize the differences relative to the three other partial flows it is possible for the area of the teeth in the stator, which are traversed by the partial flow β4, to have a flow area that is smaller by approximately 10 to 30 percent, preferably 10 to 15 percent than the other teeth.

For reasons of easier visibility, only the two flows β2 and β4, but not the flows β1 and β3, are shown in FIG. 8. FIG. 9, however, is a schematic depiction of the full inflow into the outlet channel 50 with all four partial flows. The view as shown in FIG. 9 also shows the rotor 41 from a perspective as seen from below with regard to the representation in FIG. 8. The rotor 41 and along with it the dispersion chamber of the rotor-stator system is surrounded on the outside by a housing. A ring channel 49 is configured between the rotor 41 and the housing 40.

The partial flows β1 and β3 leave the dispersion chamber of the rotor-stator system laterally, which means relative to the plane of the paper as shown in FIG. 8 toward the front or the rear. The partial flows β1 and β3 are conveyed inside the ring channel 49 toward the outlet channel 50. If the rotor 41 rotates in a counterclockwise direction (compare FIG. 8), it is possible for a part of partial flow β1 to be conveyed below the rotor 2 and mixed with the partial flow β2. But to a large extent the partial flow β1 is conveyed into the ring channel 49 and from there to outlet channel 50. The partial flow β3 is supported by the rotational movement of the rotor on its way toward the ring channel 49 and from there to the outlet channel 50. The four partial flows β1 to β4 arrive each from different directions when they enter the outlet channel 50, they collide and intensively intermix with each other. This helps to maintain the flow of the fluid stream in the turbulent range, even after leaving the dispersion chamber.

The outlet apparatus 5 comprises an outlet channel 50 having a first opening 51, and during operation the fluid from the dispersion chamber and/or the ring channel 49 enters the outlet channel 50. The outlet channel 50 has a second opening 52 through which, during operation, the fluid leaves the outlet channel 50. The first opening 51 has a larger cross-sectional area than the second opening 52. Consequently, the outlet apparatus is configured as a concentric restrictor. The first opening 51 is configured as rectangular having its largest width 510 parallel relative to the plane in which the rotor 41 rotates. Reference sign 44 designates the flow area of the ring channel at the location where said ring channel transitions into the outlet channel 50.

The partial flow β1 passes through the flow area 44 as provided in the model. The reference sign 45 designates the flow area through which the partial flow β2 passes below the rotor according to the model concept. Reference sign 46 designates the flow area of the ring channel at the location where said ring channel transitions into the outlet channel 50. According to the model concept, the partial flow β3 passes through the flow area 46. The flow area 47 is the flow area exiting the dispersion chamber where, according to the model concept, the partial flow β4 leaves the dispersion chamber. The partial area 47 is, in particular, the surface in the area where the teeth of the stator are configured in such a way that they have an approximately 10 to 30 percent, preferably 10 to 15 percent, smaller flow-through area than the remaining teeth (compare comments above).

All the flow areas 44, 45, 46 and 47 have approximately the same size, except for area 47 which is smaller by at least 5 percent, preferably by at least 10 percent ranging to at the most 30 percent, preferably at the most 15 percent, than the other areas. The sum of the flow areas 44 to 47 corresponds approximately to the free flow area in the discharge apparatus 48 that can be connected to the outlet channel 50. The stabilization of the product in turbulent flow is completed inside the outlet channel 50 and the subsequent discharge apparatus 48.

The following harmonization of the flow areas relative to each other has proved advantageous to this end. Reference is being made to the cross-sectional area of the tube line 25 in the intermediate piece 2. Its flow area is assumed to be 100 percent. Relative to it the flow area through the inner toothed ring of the stator 430 is approximately 50 to approximately 85 percent. The flow area through the outer toothed ring of the stator 433 is approximately 35 to approximately 70 percent. The sum of all areas 44, 45, 46 and 47 is approximately 35 to approximately 65 percent. The flow area of the discharge apparatus 48 is also approximately 35 to approximately 65 percent.

It is crucial that the sum of the areas 44 to 47 corresponds approximately to the flow area of the discharge apparatus 48. The above-referenced conditions of the flow areas within the dispersion chamber contribute to a suppression of the tendency of the formation of cavitations inside the dispersion chamber. The selected conditions for the flow areas between the teeth of the outer toothed ring of the stator as well as for the areas 44 to 47 and the discharge apparatus 48 help to avoid an acceleration drop after leaving the dispersion chamber. The critical flow quantity is β1.

Figure 10:
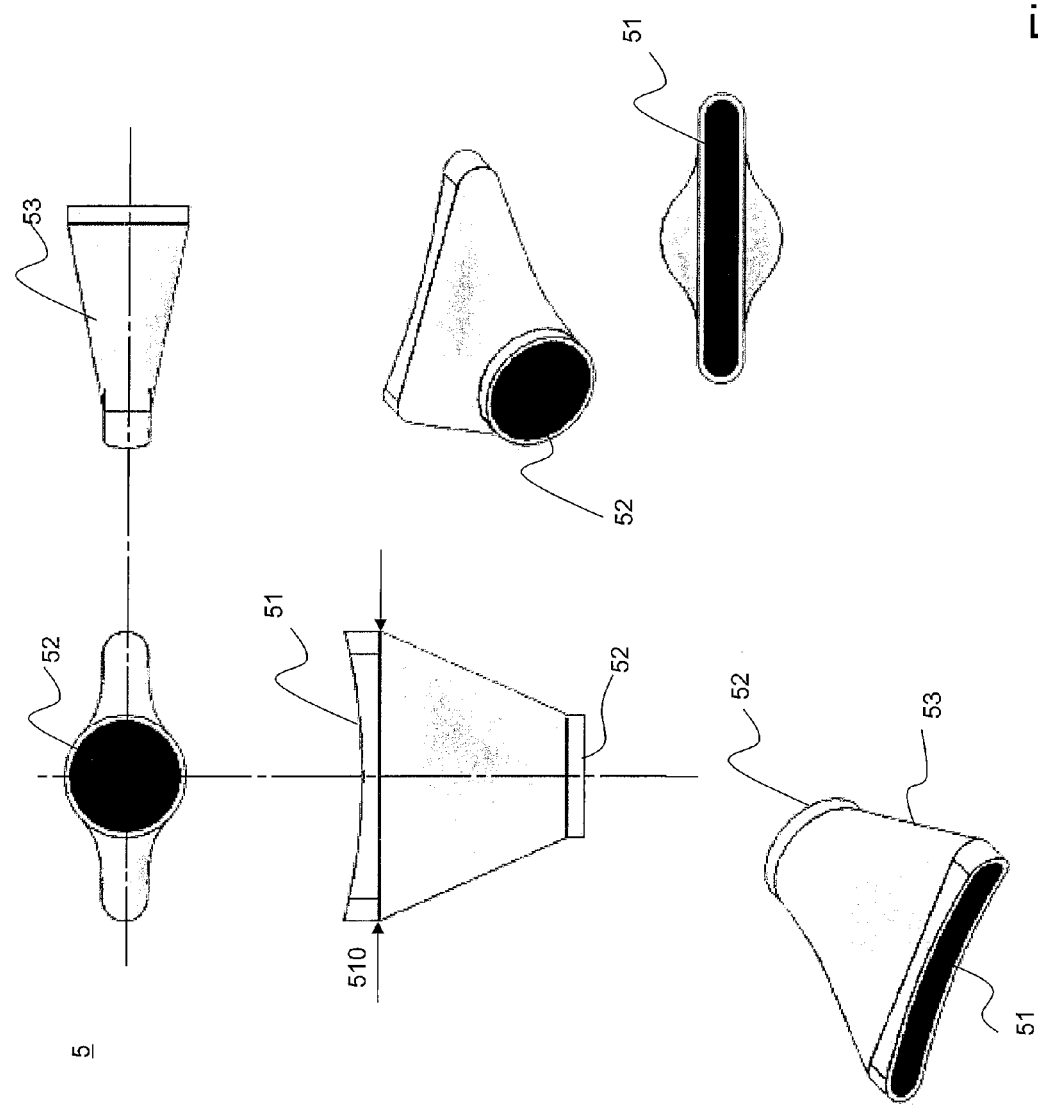
FIG. 10 a front view, rear view, lateral view and top view as well as a perspective view from the front and the rear of a schematic representation of an outlet apparatus according to the invention.

FIG. 10 is a representation of the outlet apparatus 5 as seen from different perspectives. On the top left there is a front view of the outlet apparatus 5 with the second opening of the outlet channel 52 pointing toward the observer. In the top right view the substantially tapered shape of the outlet apparatus 5 can be seen, with part 53 that is designated as the cone. On the left side in the middle of FIG. 10 the observer finds a top view of the outlet apparatus 5, as viewed from the vicinity of the first opening 51, by which the outlet apparatus 5 can be connected with a corresponding opening in the housing 40 on the rotor-stator dispersion machine 4; with the rectangular opening of the outlet apparatus having its largest width 510 at that location.

The rear view of the outlet apparatus 5 on the bottom right side in FIG. 10 provides a view into the substantially rectangular opening 51. Said opening is, in comparison with the circular opening 52, configured as a long and relatively narrow slit with rounded ends. The perspective views of the outlet apparatus 5 on the right side in the middle of FIG. 10 and on the bottom left side of the same figure illustrate how, due to the configuration of the substantially conical shape 53, a gradually winding transition is achieved between the opening 51 and the opening 52.

Figure 11:
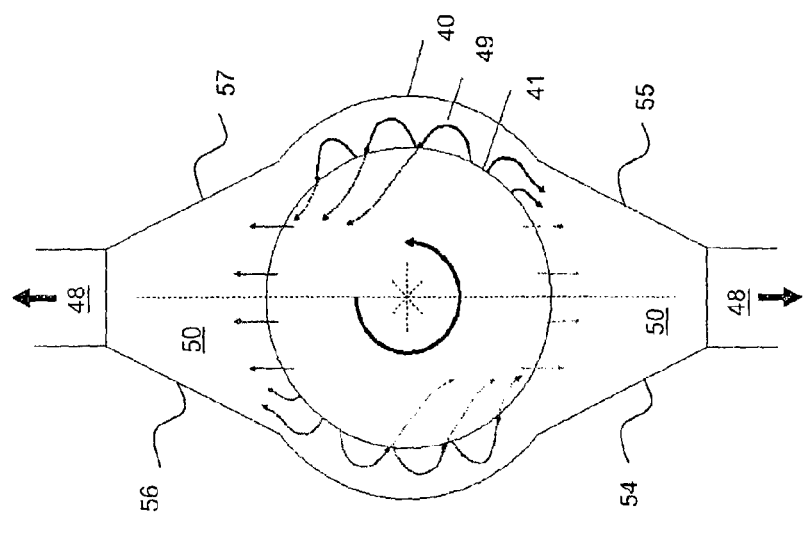
FIG. 11 a schematic representation, seen in a top view, of an outlet apparatus with two outlet channels.

FIG. 11 depicts a further embodied example of the outlet apparatus 5. It comprises two outlet channels 50 that are located opposite each other in the shown representation. During operation, the fluid is directed from both outlet channels 50 in one or several discharge apparatuses 48. The arrow in the present representation points to the discharge apparatuses 48. The fluid, which leaves the dispersion chamber, is redirected inside the ring channel 49 between the rotor-stator dispersion and the housing 40 system.

The arrows that are drawn in a solid line represent this redirection. The fluid is directed in the direction of both outlet channels 50. The arrows that are drawn in a perforated line indicate the partial flows by which, during operation, the fluid is directed below the rotor toward the outlet channels 50. The outlet channels have side walls 54 and 55 and 56 and 57 respectively. At the transition between a side wall 54 and an outlet channel 50 to the side wall 56 of the neighboring outlet channel 50 there is located a section of the ring channel 49. The ring channel 49 is thus interrupted by the outlet channels 50.

The outlet apparatus with two outlet channels can be connected with a recirculation line by an inter-positioned T-piece (not shown). The discharge apparatuses 48 that are depicted in FIG. 11 are thus combined into a single line. Before the entry in the two supply pipes of the T-piece, it is possible to envision valves in each discharge apparatus 48 and/or in each outlet channel 50 and/or in the joint discharge line of the T-piece (compare also below the description regarding FIG. 14) that can be used to adjust the counter-pressures in the two product streams of the supply pipes of the T-piece, specifically in order to prevent any cavitations.

The function of the dual system as shown in FIG. 11 having an outlet apparatus with two outlet channels is based on the model concept as explained above using FIG. 9. The outlet apparatus with two outlet channels, on the other hand, is an improvement of the former because there are fewer redirections of the fluid, after the fluid has left the dispersion chamber, with the two wide outlet channels. This further minimizes the formation of dead space and, therefore any partial laminar flow after the dispersion chamber. The outlet apparatus with two outlet channels offers the possibility of accelerating the product that is released at a right angle from the dispersion chamber relative to the two outlet channels by the rotation of the rotor 41 toward an outlet channel 50.

The flow transfer surfaces in the area of the outer toothed ring of the stator, which is adjacent to the outlet channel 50, are harmonized with the surfaces in the outlet channel. The configuration is achieved in such a way that, during operation, the Reynolds number for the respective fluid can be maintained at above 10,000. This also counteracts any coalescence of drops of an emulsion while is passes through the outlet channels and the transition from the dispersion chamber into the outlet channels.

Figure 12:
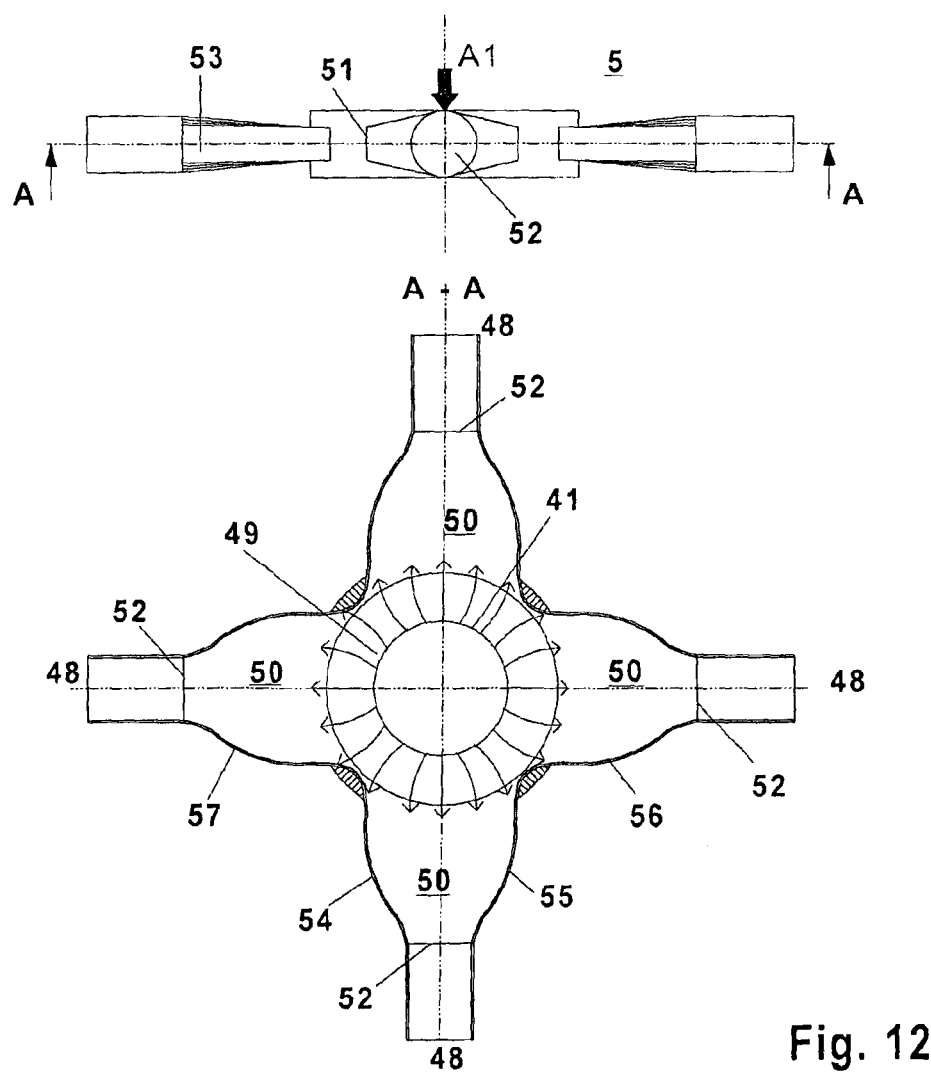
FIG. 12 a schematic representation, seen in a top view and a lateral view, of an outlet apparatus with four outlet channels according to a further embodied example of the invention.

In a further embodied example according to the invention the outlet apparatus 5 comprises four outlet channels 50. This embodied example is depicted in FIG. 12. The contour of the outlet channels 50 is selected in such a way that only small bars remains for the transitions between the channels, which means only very minimal dynamic pressures can develop that will hardly decelerate the turbulent flow. The gradually winding transitions from the bars to the outlet channels 50 minimize the dynamic pressures in each outlet channel.

The transition from one side area 54 (55) to the side area 57 (56) of the respectively adjacent outlet channel 50 takes an arched course. The arrows in the sectional view at the bottom of FIG. 12 illustrate the model concept for the flow of the fluid through the outlet apparatus 5 when exiting from ring channel 49 and entering the outlet channels 50. If dynamic pressure develops at the bars at the location of the transition between two neighboring outlet channels 50, the product would be briefly pressed below the rotor, accelerated there and then pressed into the next outlet channel.

The outlet apparatus with four outlet channels can be connected to a recirculation line by an inter-positioned double T-piece (not shown). The discharge apparatuses 48 that are shown in FIG. 12 are thereby combined into a joint line. Before entry in the four supply pipes of the double T-piece, it is possible to provide valves in each discharge apparatus 48 and/or each outlet channel 50 and/or in the joint discharge line of the T-piece before (compare also the description for FIG. 14) that will allow for adjusting the counter-pressures in the four product streams of the supply pipe of the double T-piece, specifically in order to avoid any cavitations.

Matching the outlet apparatus 5 with four outlet channels 50 that is depicted in FIG. 12, the stator of the dispersion machine that is used in combination with the outlet apparatus 5 can be configured in such a way that the sections of the stator that are opposite the entry openings of the outlet channels 50 have an exit area that is dimensioned in such a way that it matches the entry openings of the outlet channels 50. For example, with the assistance of flow simulations, the person skilled in the art can implement this configuration in such a way that it is possible to maintain a Reynolds number of Re<10, 0000 during operation. In this context, the sum of the entry areas in the outlet channels 50 is smaller or equals the sum of the exit areas from the stator.

With the measures as described above, which the invention envisions for the intermediate piece 2 and the outlet apparatus 5, it is ensured that the fluid is always maintained in a turbulent flow from the time it is first provided in the container, during the processing in the rotor-stator dispersion machine and, after processing, during the removal from the dispersion machine with the aid of the outlet apparatus. As shown at the outset, sometimes it is necessary to expose fluids after an initial run through the dispersion machine to another run. The corresponding installations feature a recirculation line for this purpose that can be connected with the outlet apparatus by way of a discharge apparatus.

This recirculation line returns the product that has left the dispersion machine via the outlet apparatus once again to the container. To optimize flow toward the container as well the invention further provides an inlet pipe connection. The product has a very high flow rate inside the recirculation line, for example in the range of between 2 and 4 m/s, and tends to splash upon a non-decelerated entry into the container. The inlet pipe connection helps to gradually reduce the flow rate upon entry of the recirculated product into the container, whereby the inflowing product gradually incorporates itself via the tapered floor of the cone with the product that is already present inside the container, especially if the filling level inside the container is below the inlet pipe connection. FIG. 13 is a schematic representation of an inlet pipe connection of this kind. On the right side in FIG. 13A there is a sectional view showing the inlet pipe connection 7 which transitions into an opening 16 in the container wall 15.

The inlet pipe connection 7 has an inlet opening 71; the fluid that is recirculated via the discharge apparatus enters the pipe connection 7 through said opening. The inlet opening 71 is configured as a through-hole having a diameter $D_2$ in the side wall of the inlet pipe connection 7 having a longitudinal axis that is the plumb line 180 of the longitudinal axis 150 of the container 1. Inlet pipe connection 7 has, furthermore, an feed opening 72 by which the inlet pipe connection 7 opens in the container wall opening 16. A tube line 75 of the inlet pipe connection 7 extends between the inlet opening 71 and the feed opening 72. The tube line 75 of the inlet pipe connection has a longitudinal axis 76 that encloses an angle $a_{110}$ with the plumb line 180 on the longitudinal axis of the container.

According to the invention the inlet to the container is constructed in such a way that the area from the entry pipe, which is the cross-sectional area 710 of the inlet opening 71, corresponds at most to 50 percent of the area of the product entry into the container, which is the cross-sectional area 720 of the feed opening 72. As shown in the top view left of FIG. 13A, the contour of the tube line 75 widens in the area 751, which opens in the inlet opening 71, toward the container 1 by a radius $R_1$ toward the outside.

During operation this results in the inflowing product to be distributed over a large area on the container floor. A sudden expansion is thus prevented in the area 751 so that any occurrence of a shock loss according to Borda-Carnot is avoided. A shock loss according to Borda-Carnot could cause strong vortices in the area of the fluid inside the container where the recirculated product enters through the inlet pipe connection. The length of this area with vortices would be approximately ten times the diameter of the feed opening 72. But the product is to be added evenly to the fluid still remaining in the container 1. By an advantageous construction according to the invention the product is directed against the opposite wall at an angle $a_{110}$ of approximately 90° to 150° and is thereby, expanding in the tube line 75, pressed against the container. The speed decreases continually, and the product follows the special contour in the area 751 of the feed opening. This does not result in any vortex formations that could disturb the way the fluid is directed inside the container. To this end, the total length $L_{Ein}$ of the inlet pipe connection only needs to be twice to six times the diameter $D_{Ein}$ of the inlet opening 71. The longer the length of the inlet pipe connection, the more intense the calming of the medium entering the container.

An improvement according to the invention provides for the angle $a_{110}$ to be in the range between 45° and 180°. If the angle is 180°, the inlet pipe connection can, as shown in FIG. 13B, approach the container horizontally at the upper arch of the container for the configuration of an upper inlet into the container. The entry can also be configured vertically relative to the container so that the product is directed downward along the container wall and then distributed onto the product level located inside the container.

The following table provides an overview of possible ratios for the cross-sectional areas 710, 720 at different nominal diameters DN of the tube line 75 of the intermediate piece 7:

| Nominal diameter of 75 | 710 in mm² | 720 in mm² |
|---|---|---|
| DN 40 (41 × 1.5 mm) | 1134 | 120 × 20 = 2400 |
| DN 50 (53 × 1.5 mm) | 1963 | 200 × 20 = 4000 |
| DN 65 (70 × 2.0 mm) | 3420 | 250 × 30 = 7500 |
| DN 80 (85 × 2.0 mm) | 5150 | 250 × 40 = 10000 |
| DN 100 (104 × 2.0 mm), | 7850 | 320 × 50 = 16000 |

FIG. 13C depicts another embodied example of the inlet pipe connection 7. In addition to the concave configuration of the curvature radius $R_1$ of tube line 75, viewed in reference to the longitudinal axis 76, the area 751, where the feed opening opens in the container, has areas that are directed toward the container wall opening 16, where the feed opening has convex contours in reference to the longitudinal axis 76 of tube line 75. At that location the opening has a curvature radius $R_3$ and/or $R_2$. The radius $R_3$ and/or $R_2$ is at least 1.2-times of half of the container diameter $D_1$ and at most double of half of the container diameter $D_1$.

Figure 14:
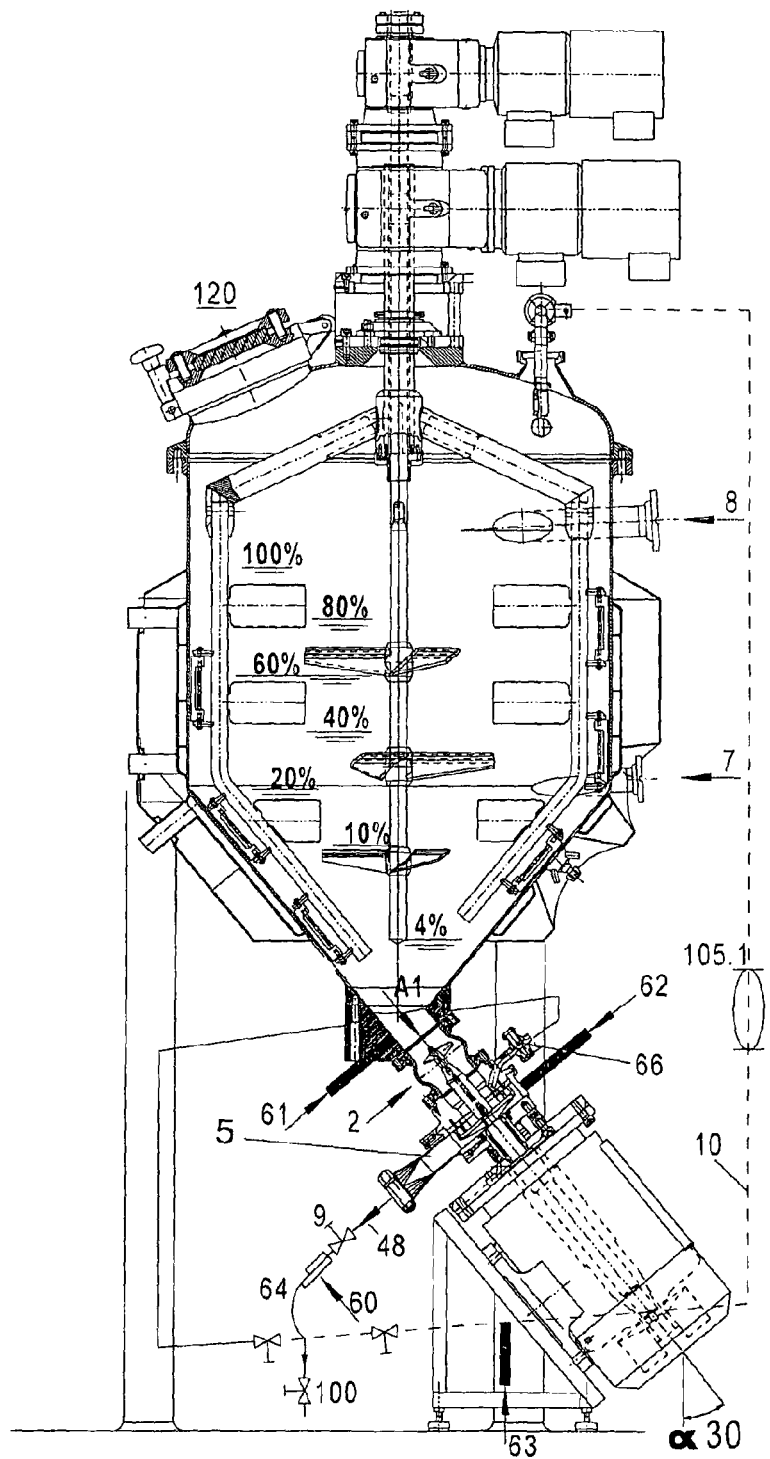
FIG. 14 a schematic representation, seen in a lateral view, of an installation according to an embodied example of the invention.

FIG. 14 depicts an installation system 120 that comprises a container 1. The percentage figures that are entered in the schematic representation of container 1 illustrate different filling levels of the container, starting with 100 percent at the top and ranging down to a filling level to four percent at which level the corresponding fluid is only located on the tapered container floor. During operation, from the container 1, the fluid enters the intermediate piece 2, before it is fed into the rotor-stator dispersion machine 4. After processing inside the dispersion chamber, the fluid leaves the rotor-stator dispersion machine 4 by the outlet apparatus 5. A discharge apparatus 48 is connected to the outlet apparatus 5, which is configured as a tube line and constitutes a recirculation line 10. The product is returned to the container by the recirculation line 10. Marked in the representation in FIG. 14 are two inlet pipe connections 7 and 8 by which the product can be recirculated to the inside of the container. When the product has achieved the desired properties, it can be removed from the system 120 by a removal apparatus 100. A valve 9 is integrated in the discharge apparatus 48, in particular a throttle valve, to be able to adjust and/or control and/or regulate the flow inside the recirculation line.

In one embodied example according to the invention the valve 9 can be a component of a control unit and can be configured as an adjusting valve, for example as a flap valve with a lock stop. The control unit comprises, aside from the control valve, a flow meter for monitoring the volume flow. The dwelling time inside the rotor-stator system, in particular in the dispersion chamber, can be controllably adjusted by valve 9. At the same speed, it is therefore possible to vary the dwelling time in the rotor-stator system by the counter-pressure that is to be adjusted by the valve 9. Dwelling time values of between 0.05 seconds and 0.5 seconds have been shown as useful. According to the invention it is also possible to provide a valve and flow meter at the locations of all outlet channels 50 of the outlet apparatus 5 in order to be able to control the respective flows.

The dispersion machine is equipped with a frequency converter (not shown) thereby allowing for a selection of the speed of the rotor. Thus, aside from the rotor speed, the volume flow through the system 120 and/or the counter-pressure are flexibly adjustable. In particular, it is possible to adjust different parameters for speed, flow and counter-pressure depending on whether the system is used for processing a dispersion, on the one hand, of for a cleaning of the system, on the other hand, for example CIP cleaning; this way, the respective processes can be implemented as optimally as possible.

After passing through valve 9 the fluid enters the recirculation line 10. By the recirculation line the fluid can be removed via removal location 100 or recirculated into the dispersion machine. System installation 120 is designed in such a way that it is possible to add different further ingredients in solid and/or liquid form to the product during different stages. Examples for such ingredients include, among others, active substances or carrier substances such as liposomes, which can be added to the fluid in a finely dispersed manner. The system 120 comprises several feed apparatuses for this purpose. For example, an injector 64 is provided that is positioned in the discharge apparatus after the outlet apparatus 5. With the injector it is possible to add, in particular, powder-type ingredients to the fluid. Further feed apparatuses 60, 61, 62 and 63, 66 allow for adding ingredients in the recirculation line and/or discharge apparatus, in the dispersion chamber, in particular into the ring channel 49, and in the pipe of the intermediate piece 2. A suitable injector can also be a nozzle, such as for example a tubular or sheet nozzle, as described in the utility model by the applicant DE 20 2006 001 952 "Device for producing dispersions." It is possible to incorporate additional valves even before the removal 100 and in the recirculation line or in the line that leads to the feed apparatus 66 in the dispersion machine 4.

Incorporating further ingredients into the discharge apparatus 48 via an injector, which follows the outlet apparatus 5, occurs at slight vacuum pressures inside the container, which means at a pressure that is approximately 0.3 bars lower than the ambient pressure. At higher speeds, meaning flow speeds of approximately 3 to 4 m/s, the injector generates a vacuum that is sufficient for drawing liquids without any further applied vacuum into the fluid. The added ingredients are incorporated immediately by the injector jet.

A further improvement for maintaining a turbulent flow during the flow through the system 120 can be achieved by attaching at least one vibrator (not shown) to the housing 40 of the rotor-stator dispersion machine 4 and/or the outlet apparatus 5. In order to avoid that the vibrations associated with the component that is connected to the vibrator are not transmitted to the entire system 120 the recirculation line is provided with flexible elements 105.1, for example sections made of a sufficiently bendable material.

Figure 15:
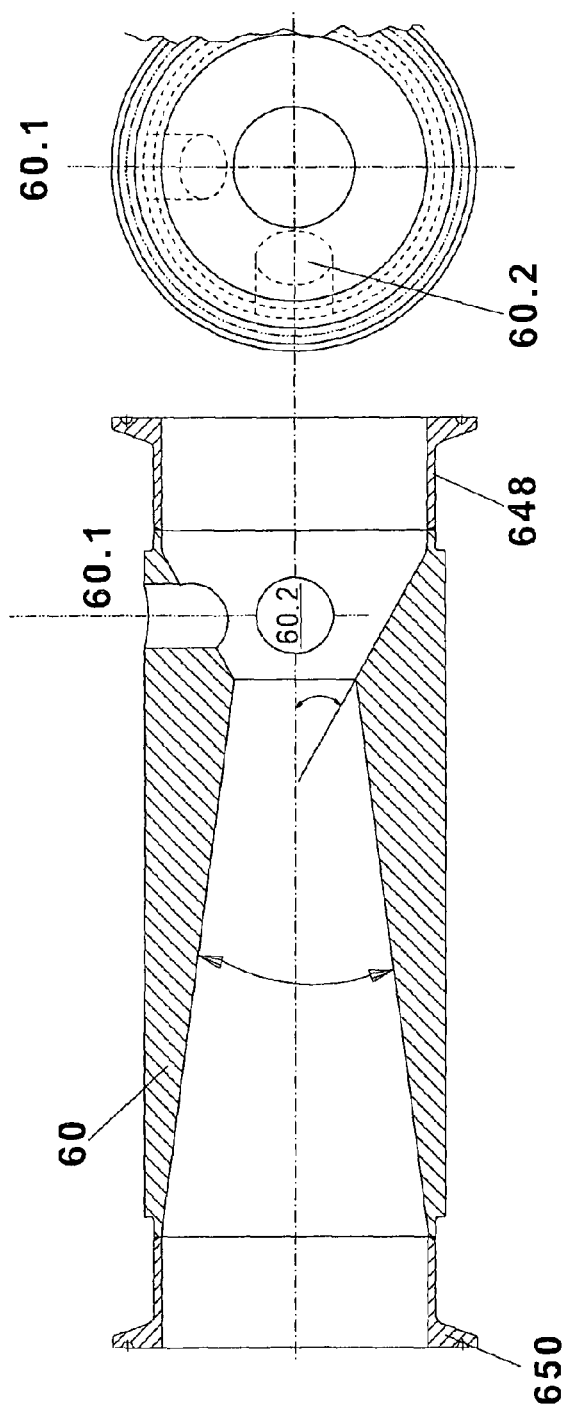
FIG. 15 a schematic representation, seen in a longitudinal view and a lateral view, of a feed apparatus.

FIG. 15 shows an embodied example for a feed apparatus 60. The feed apparatus 60 can be connected by a connecting element 650, for example a flange, with the outlet apparatus 5. Using a connecting element 648 it is possible to connect the feed apparatus 60 with the discharge apparatus 48, in particular the pipe of the recirculation pipe 10. For the addition of further ingredients that are to be added to the fluid upon the fluid leaving the rotor-stator-dispersion machine the feed apparatus 60 comprises feed channels 60.1 and 60.2. Depending on the number of respective ingredients, it is also possible to envision even more feed channels.

On the inside the feed apparatus 60 is configured essentially as a pipe having a wall contour in the shape of a double cone. Viewed in the direction of flow (in FIG. 15 from left to right), the diameter first narrows by a cone angle of 150° to the narrowest location in order to then expand again by a cone angle of 58.6°. This creates a shock diffuser according to Carnot generating such flow conditions during operation that it is possible to accommodate the addition of even powdered ingredients via the feed openings 60.1, 60.2, as well as their quick homogeneous distribution in the fluid that flows in the feed apparatus 60. The indicated cone angles are examples that have been shown to be advantageous. The person skilled in the art will adjust said angles depending on the type of fluid for which the feed apparatus 60 is to be used.

In order to maintain these flow condition for as long as possible for the fluid that flows out of the feed apparatus and is transported further into discharge apparatus 48 and/or in order to provide for a gradual flow transition to the discharge apparatus, the exit opening of the feed apparatus 60 is configured as rounded with a radius $R_5$.

Figure 16:
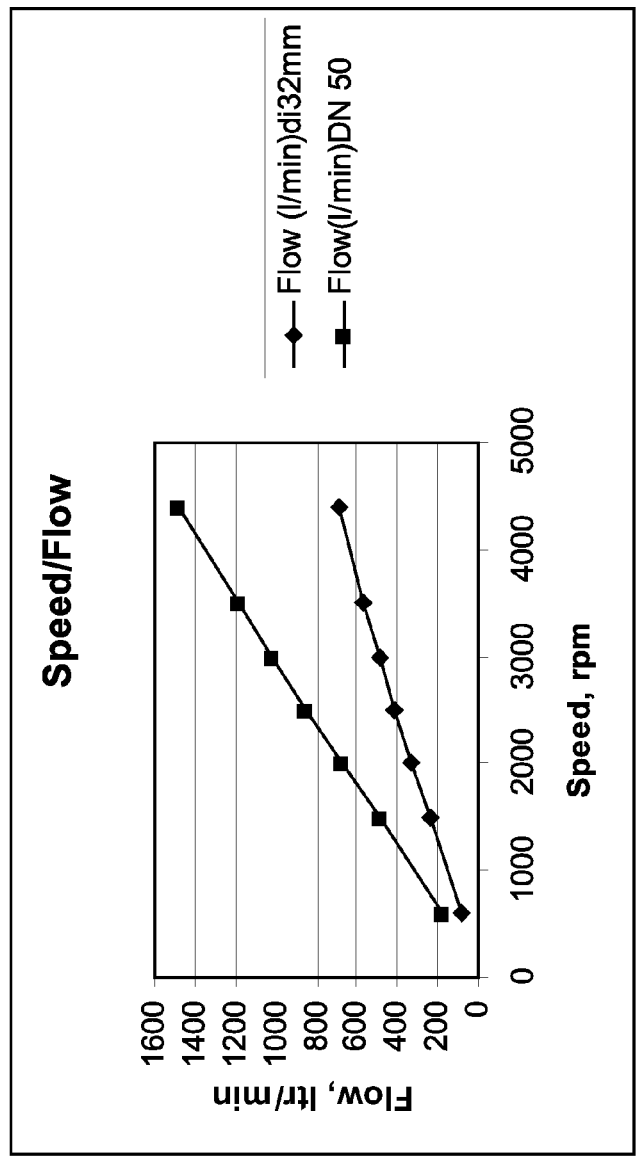
FIG. 16 a diagram that plots the volume flow of the rotor-stator system as a function of its speed.
Figure 17:
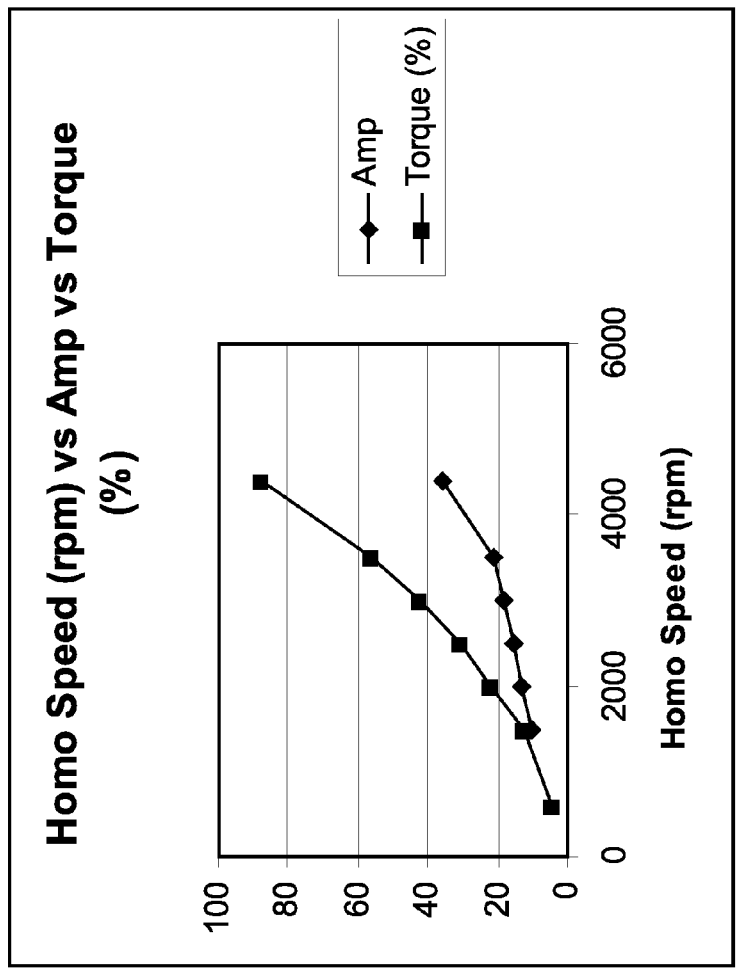
FIG. 17 a diagram that plots the torque of the rotor-stator system as a function of its speed.

The diagram in FIG. 16 plots the volume flow in liters/minute over the speed in revolutions/minute of the rotor-stator dispersion machine for two different diameters di32 mm and DN50. To this end, on the one hand, a feed apparatus (see FIG. 15) was installed with an entry DN50 and a reduction to 32 mm. On the other hand, a recirculation line having DN50 without feed apparatus was used. The employed rotor-stator dispersion machine had a nominal power of 22 kW and was operated with the intermediate piece according to the invention. Parallel to the increase in speed, the volume flow continually increases.

FIG. 16 shows a torque curve that was recorded with a container having a capacity of 500 liters and a filling level inside the container of 50 liters. The used rotor-stator dispersion machine had a nominal power of 22 kW and was operated with an intermediate piece according to the invention. Recirculation of the product into the container occurred using an inlet pipe connection 7. The torque curve clearly shows the continual increase of the torque, which is indicated in % relative to the maximum torque that can be achieved at maximum speed of the rotor-stator system. Moreover, the respectively taken up current ("Amp"), indicated in ampere, increases continually with the increasing speed of the rotor-stator system.

The continual increase of the volume flow and torque with the increasing speed of the rotor-stator dispersion machine demonstrates that it is possible to prohibit, due to the intermediate piece, any influence the rotation of the container content relative to the conveying power or the rotor-status machine during operation even at low filling levels as low as 10% of the container.

The invention thus provides for the possibility of using a relatively large batch preparation container 1 also for processing smaller batch volumes of between 3% and 10% of the maximum container filling level. With conventional systems nine different containers are needed to cover all the usual ranges; with the invention, four containers are enough. One container with a system that utilizes the intermediate piece according to the invention is able to cover an area between 40 and 500 liters; wherein conventional solutions require respectively one container for 40 to 100 liters, 100 to 250 liters, 200 to 500 liters and 350 to 1,000 liters. One further container according to the invention can cover the range between 150 to 2,000 liters; wherein conventional solutions require respectively one container for 700 to 2,000 liters and 1,500 to 4,000 liters. One further container according to the invention can cover the range between 500 and 6,000 liters; wherein conventional solutions require respectively one container for 2,000 to 6,000 liters and 4,000 to 12,000 liters. Finally, one further container according to the invention can cover the range between 15,000 and 20,000 liters; wherein conventional solution require one container for 7,000 to 20,000 liters.

Example 1

Hair Dye 4 kg Texapon are dispersed in 20 kg water for preparing a batch of 100 kg in a system installation comprising a container of 500 kg capacity. For the system with an intermediate piece according to the invention this is not a problem because the rotation of the product upon entering the dispersion machine is suppressed, due to the connection angle of the dispersion machine with the container and due to the propeller acting in concert with the flexible element, such as the rubber bellows.

Example 2

Cleaning

The invention allows for reducing water consumption during CIP or SCIP cleaning applications to a minimum to possible minimum water quantities (filling quantity of the container) of 4-5% of the batch size. A system as described in Example 1 can be cleaned completely with 40 liters total quantity in two cleaning runs.

Example 3

Producing Anti-Aging Creams Containing Liposomes

In order to incorporate nano-particles, such as for example liposomes, into cosmetics, it is possible to install a tubular or sheet nozzle at different positions between the suction channel and the outlet channel (see reference signs 63, 64, 65). The task of the tubular or sheet nozzle consists in generating minimally-sized particles at high pressures and in spraying them into the fluid flow that must traverse the rotor-stator dispersion machine. The tubular or sheet nozzle is operated as a nozzle of a high-pressure homogenizer and can be configured, in particular, as described in the above cited German utility model by the applicant. The position 63 is especially well suited because the propeller, with guide sleeve as a conveying means inside intermediate piece 2, achieves good mixing. But the tubular or sheet nozzle can also be installed in one or several of the further connections 66.

According to further embodied examples it is also possible to use the invention in the context of systems that operate according to the principle of late product differentiation. The late product differentiation process is generally as follows: Large batches of a base product are produced; added to this can be depending on the daily production requirements the still-missing ingredients, such as colors, flavors, aromas and/or other additives that can be added, in particular divided in partial quantities, to round off the product. This means that large batch sizes are finished in several smaller partial quantities a short time before the product is filled in containers.

This process increases the effectiveness and the flexibility of the production process. Due to the fact that it is normally required that the system is cleaned between individual steps in the production of the different partial quantities, it is crucial that the LPD unit according to the invention is very compact in order to reduce product losses during this cleaning step as much as possible. Furthermore, the LPD unit according to the invention is easy to clean, for example by CIP (Cleaning in place) and/or automated cleaning and sanitizing (SCIP). The utilization of the LPD unit according to the invention produces, moreover, extremely small amounts of waste water in comparison to conventional systems.

Example 4A

LPD (Late Product Differentiation)

A tubular or sheet nozzle is combined at the feed apparatus 61 with the system having the rotor-stator system 4. Large batches have the advantage of reducing the amount of required manual work and that the individual steps only have to be implemented once and not several times. This is also true for work in the laboratory. Consequently, in the production of hair dye, the coloring agent is expediently incorporated last at the very end of the production of the entire batch. For example, a batch of 20,000 kg base product is prepared, and the coloring agent of approximately 10 kg is initially not incorporated with the base product. A suitable installation system comprises an outlet apparatus having two outlet channels and a power rating of 45 kW. A volume flow of approximately 3,000 l/min is recirculated inside the system without being throttled. The recirculation time of the batch is approximately 7 minutes. The coloring agent is dosed approximately during a single recirculation period; this will result in a very homogenous product.

If the goal is to separate the batch in order to produce two or several colorings, the product is colored after its removal 100, and wherein the recirculation line is closed. A small quantity containing a blend of the first and second colors is disposed of between the incorporation of the first and second colors. Instead of a feed apparatus 61, 62, 63, for example in the form of a nozzle, it is possible to install two or multiple nozzles in the nozzle areas.

Example 4B

LPD (Late Product Differentiation)

A further possibility provides that the completed batch is drawn off as a partial quantity via the outlet 100, and the excess is recirculated in the dispersion chamber, and therein the coloring agent or other additives are added through a nozzle (preferably 61, 62) in order to achieve more intense intermixing (multiple runs through the rotor-stator dispersion machine). The recirculation into the dispersion chamber can be effected, in particular, by one or several premixing chambers of the rotor-stator system, provided a rotor-stator system is used, as described in the German patent application DE 10 2008 022 355.7.

The recirculation line is shut off by a valve behind outlet line 100. It is expedient to start with the lighter colors that are subsequently more easily covered by the darker color. Advantageously, it is thus useful to produce a base batch of the product (bulk batch) which is completed when it is pumped from the container by the addition of the still pending additives.

Example 4C

LPD (Late Product Differentiation) in Special LPD Unit

An LPD unit is a compact system unit for "late product differentiation." This means in the context of the production of a product, which may be an emulsion, dispersion, suspension, blend or something similar, the final ingredients are only dispersed to a prefabricated base product, which can be a concentrate, a short time before the final product is filled in bottles, tubes, pots or other packing drums. Two exemplary solutions will be described below that are designated as "LPD unit I" and "LPD unit II."

For the LPD unit it is possible to advantageously use components in combination that are in part the subject of further patent applications and utility models by the applicant. These are specifically the following components:
  a) One or several premixing chambers as described in the patent application family DE 10 2008 022 355.7-23.
  b) Rotor geometry as described in the patent application family DE 10 2008 045 820.1,
  c) One or several flow disrupters (see above),
  d) Outlet apparatus, specifically in single and dual configuration (see above)
  e) At least one tubular or sheet nozzle according to utility model DE 20 2006 001 952.

A mixer head is placed on the respective dispersion apparatus comprising feed and discharge apparatuses. In particular, the mixer head can be configured in such a way that the mixing chamber inside it is configured substantially in the shape of a hollow sphere. In the following such a mixer head will be designated a "spherical mixer head."

Figure 18:
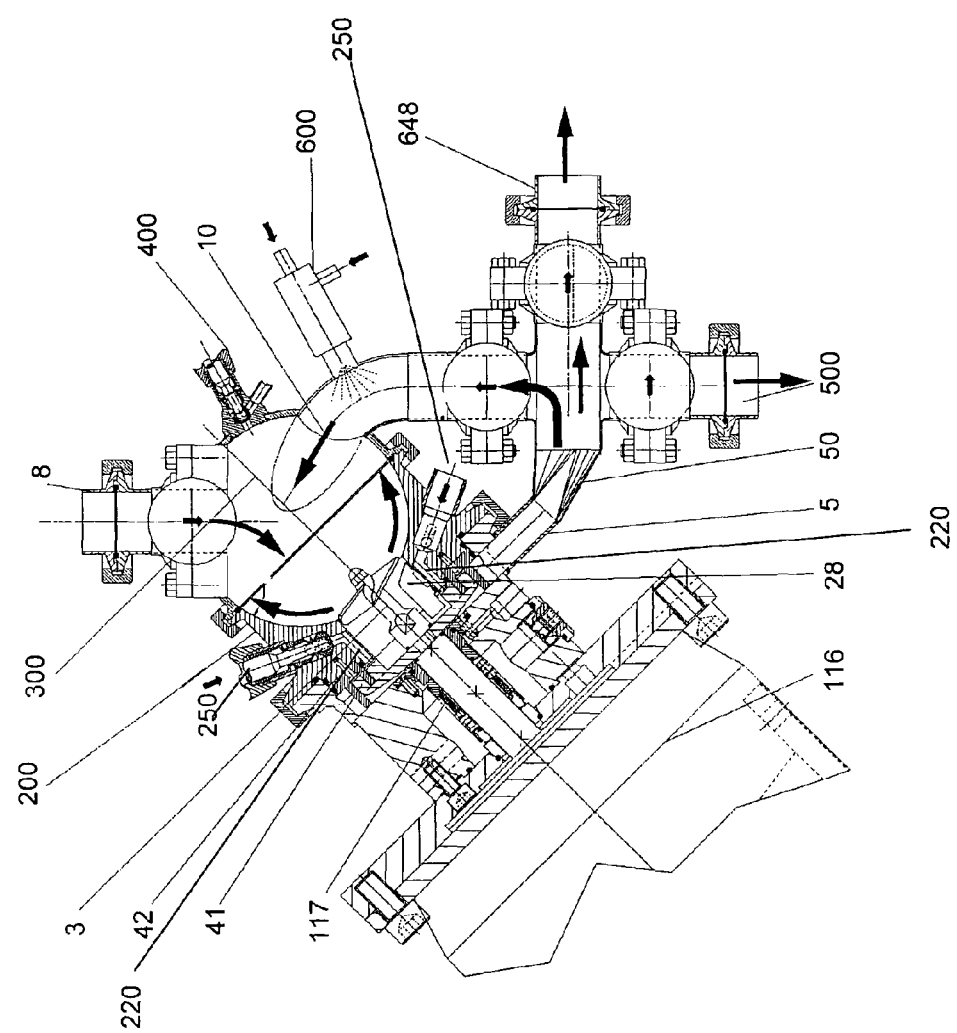
FIG. 18 a schematic representation, seen in a longitudinal section, of an installation configured as a late product differentiation system, a so-called "LPD unit" according to a first embodied example of the invention.

The functional operation of the LPD unit will be described below using the FIGS. 18 and 19. The product that is to be processed is added to the spherical mixing chamber 300, for example by a flow counter (not shown,) through the product inlet 8, for example by an automated valve. In the shown example the spherical mixing chamber 300 is constituted, on the one hand, by an essentially semi-spherically shaped upper lid that comprises connections for the product inlet 8, a blow-off valve 400 (see below) and the recirculation line 10, and, on the other hand, by an LPD housing 200 that is also essentially semi-spherically shaped on its inside and opens into a pipe in which a propeller 3 and flow disrupter 28 are positioned; and said pipe transports the product to the dispersion chamber of rotor 41 and stator 42 and/or premixing chambers 220.

The operating dispersion machine 41, 42 draws in the product, and a part of the product is brought in contact with the missing ingredients in the premixing chamber 220. These missing ingredients are, in particular, added to the premixing chambers 220 by feed apparatuses 250 via flow counters (not shown) and pumps (not shown). The embodied examples that are depicted in FIGS. 18 and 19 are each provided with two premixing chambers. But the invention allows for adjusting the number of premixing chambers of the LPD unit depending on the requirements, whereby at least one but also more than two mixing chambers are envisioned.

The individual components of the dispersion pass through the dispersion chamber, during which process they are dispersed, and the dispersion is recirculated by the product recirculation line 10 to the mixing chamber 300. The product recirculation line 10 is brought back to the mixing chamber 300 in such a way that it counteracts the rotational movement of the propeller 3.

Normally the mixing chamber 300 has the approximate diameter of the rotor 41 in order to minimize the recirculation volume. For example, by way of a modular design principle, the following rotor sizes can be provided for the rotor: 25 mm, 50 mm, 100 mm, 150 mm, 175 mm and 285 mm. A blow-off valve 400 is mounted at the highest point of the mixing chamber 300 in order to press residual quantities from the LPD unit to a filling machine downstream of the LPD unit in order to minimize losses.

In addition, in the shown embodied examples a tubular or sheet nozzle 600 according to DE 20 2006 001 952 is connected by a flange connection with the product circulation line 10 or mixing chamber 300. Depending on the requirements, it is also possible to forego this additional nozzle 600. Using the tubular or sheet nozzle 600 it is possible to achieve an especially fine dispersion; in particular, with an additional tubular or sheet nozzle 600 it is possible to generate emulsions and/or dispersions separately. Correspondingly, in addition to the processes in the premixing and the dispersion chambers, with the rotor 41 acting in conjunction with the stator 42 inside the latter, it is advantageously possible to generate a further emulsion inside the emulsion.

At the same time, when the (not shown) valve is opened at the product inlet 8, the (not shown) valve at the product outlet 648 is also at least slightly opened in order for the inflowing product and the outflowing product to be substantially balanced and the overpressure that is generated to only slight. The valve at the product outlet 648 can be configured, in particular, in such a way that it is only opens in its lower area (semi-ball-type valve) so that only the product that is released below the rotor is discharged through the product outlet 648.

After the outlet channel 50 follows, aside from the product outlet 648 and the recirculation line 10, also a pipe connection for the rinsing water outlet 500.

It is also possible to use outlet channels according to the above-described "dual" embodied example, and wherein one outlet channel leads, for the purpose of recirculation, to the recirculation line 10 and a further outlet channel for the discharge of the product from the machine to the (not shown) filling machine that is disposed downstream of the LPD unit.

The dispersion machine internally recirculates approximately a product quantity that is ten times the quantity that is added and/or discharged. The result is a homogenous mixing of all ingredients before the product leaves the LPD unit.

The propeller 3 is mounted and positioned inside the LPD unit in such a way that at least one third of the drawn-in product is pressed radially over the floor of the mixing chamber 300. This process optimizes the internal premixing inside the mixing chamber with the assistance of the gentle propeller mixing.

Normally the goal is to produce a homogenous product with the fewest number of runs through the LPD unit as possible. This is achieved with the described mixing chamber 300 of the LPD unit, due to the optimized premixing of the base product with the recirculated product inside the mixing chamber 300.

For example, using a base product as foundation it is possible to produce a face cream in the following manner.

Approximately 1 vol-% liquid coloring agent and 0.1 vol.-% aroma agents are added in the LPD unit to the base product. A filling machine downstream of the LPD unit having a capacity of 200 tubes per minute, tube size 60 ml, requires approximately 12 kg product/minute. A recirculation ratio of 1:5 is adjusted for the correspondingly viscous product; this means one volume part is removed while five volume parts are recirculated.

This production method can be implemented, for example, using a product by the applicant designated as "LPD-Unit LM 100" having a rotor diameter of 100 mm. The total volume of the LPD unit is below two liters, and wherein (measured with water) a recirculation volume of approximately 8,000 liters/hours is achieved at 23 m/sec.

Figure 19:
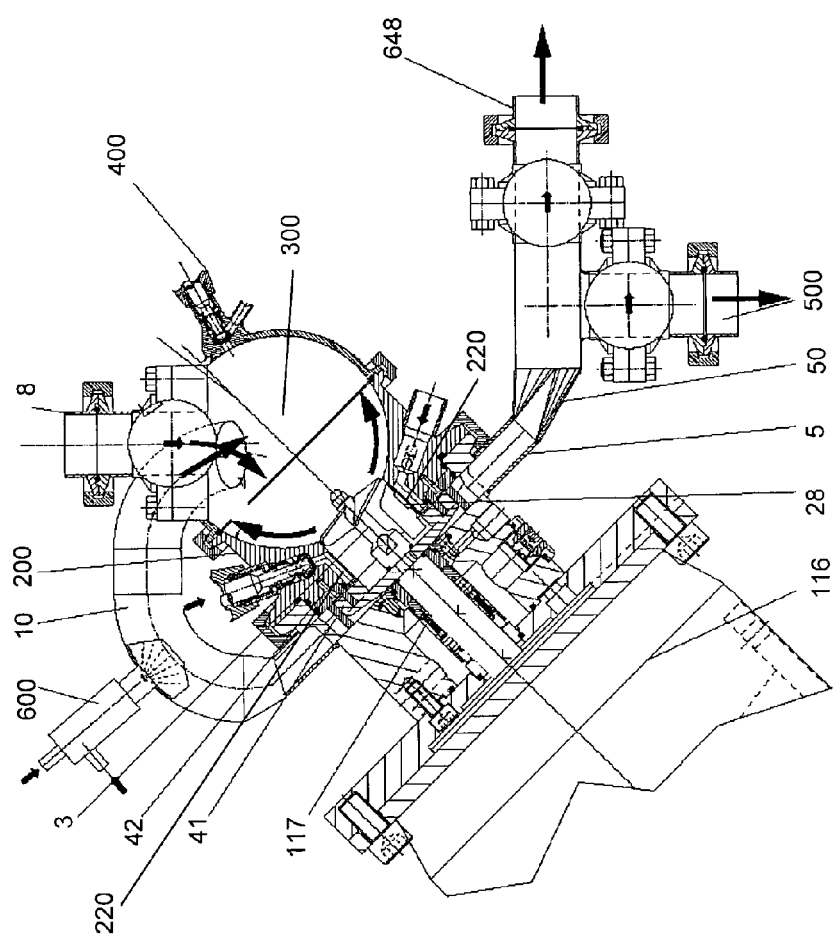
FIG. 19 a schematic representation, seen in a longitudinal section, of an installation configured as a late product differentiation system, a so-called "LPD unit" according to a second embodied example of the invention.

FIG. 19 shows a further embodied example of an LPD unit. In contrast to the embodied example that is seen in FIG. 18, the outlet channel 5 is separated from the recirculation line 10. The premixing chamber 220 that is shown on the left side in FIG. 18 is drawn as offset and located next to the premixing chamber 220 in FIG. 18 on the right side, in the area of the internal product recirculation. The product stream divides into an internal product recirculation and a product outflow in the direction of the product outlet 648. This means that the discharged product does not come into contact with a premixing chamber 220 when it leaves the LPD unit.

Example 5

Silicone Dispersion

Rotor-stator systems are suitable for the production of industrial dispersions of 5 weight-% silicone in 95 weight-% water (quantities including emulsifiers) with the smallest droplet sizes in the range of several nanometers. Rotor-stator systems demonstrate very good droplet breakdown at higher viscosities. Consequently, 5% silicone is prepared in the container, dispersed into this are approximately 2 to 3% water using a suitable emulsifier, the mixture is intensively homogenized and/or dispersed and then mixed with the remaining water.

Example 6

Emulsion with Phase Inversion O/W

The goal is to produce an emulsion with an inner phase of 4 weight-percent. The oil and wax phases are prepared in the container. An approximately 4% part of the water phase is added and dispersed within the mixture so that a water-in-oil emulsion results. The water phase can be added cold; the result is a mixed temperature that can be above the solidification point of the oils and/or waxes. After the finished dispersion, the remaining quantity of water is added and the phase inversion occurs. If necessary, it is possible to add further raw materials. Cooling of the batch is not necessary because the water phase was added cold. This saves considerable amounts of energy and batch-preparation time.

Example 7

Scale Up

Laboratory and production machines should for the most part have the same geometries and operational parameters; moreover, they should allow for conducting the involved processes in the same time-related manner. With the product flow, optimized by the invention, through the rotor-stator dispersion machine and/or system installation it is possible to produce the smallest laboratory dispersion machines having batch volumes of between 0.1 and 1.0 liters for the preparation of comparable products as with production machines.

The smaller the dispersion machine, the larger becomes the ratio of the surface relative to the operational volume of a dispersion machine. This results in higher losses due to friction and/or pressure losses in the dispersion machines of decreasing size. This negative influence is especially great when processing products having high viscosity as, for example, the products listed in the above examples. Due to the adhesion of the product on the surfaces, flows are interrupted. Using the following geometric diameter ratios, a scale-up according to the invention has proved very much possible: for a laboratory machine having a capacity of one liter the ratio of the diameter of the rotor-stator system relative to the diameter of the container is 120 mm/24 mm=5. For a production machine having a capacity of 500 liters the ratio of the diameter of the rotor-stator system relative to the diameter of the container is 930 mm/150 mm=6. The ratio of ⅚ is to be viewed as sufficiently similar.

Example 8

Preparation of Emulsions

Oil-in-water emulsions of mineral oil and water were produced. Tween 80 and Span 20 were used as emulsifiers. The total duration of the production was 15 minutes.

A two-tank system was employed for preparing the fluids. 24 liters of an aqueous emulsifier solution were prepared in a container having a volume of 30 liters. 6 liters oil was provided in a further preparation tank. The container is connected by a line with a transfer pump with the preparation tank. A rotor-stator dispersion machine is connected to the two-tank system. Advantageously, it is possible to use a rotor-stator dispersion machine with a premixing chamber according to the German patent application DE 10 2008 022 355.7 by the applicant for adding the oil phase.

The dispersion chamber with the rotor has a diameter of 100 mm. At a rotor speed of 1,000 revolutions per minute the peripheral speed is 5.2 m/s. At a rotor speed of 5,000 revolutions per minute the peripheral speed is 26 m/s. After passing through the rotor-stator dispersion machine the emulsion was recirculated to the container by an outlet apparatus with an outlet channel.

For the tests listed in the table below with numbers 1 to 6 the oil was added slowly at six liters per minute.

Experiments were conducted with a fully opened valve 9 (compare FIG. 14); they are marked by "Open" in the table below. Moreover, experiments were conducted in which the valve 9 was two thirds closed, thereby generating an artificial dynamic pressure. These experiments are marked by "Dynamic Pressure" in the table below.

In the column "Test 1 (μm)" the results are indicated for the mean drop size of an emulsion after a one-time run through the dispersion machine. In the column "Test 2 (μm)" the results are indicated for the mean drop size of an emulsion after multiple runs through the dispersion machine in the circulation after a total duration of the experiment of 15 minutes.

The drop size distributions were determined with a measuring instrument by the equipment manufacturer Horiba in accordance to the principle of laser light refraction. "Average Size" refers to the mean value from the results from Test 1 and Test 2.

|  | Test 1 | Test 2 |
| --- | --- | --- |
| Rotor speed (rpm) | 3,000 | 3,000 |
| Valve 9 | Open | Dynamic pressure |
| Test 1 (μm) | 0.812 | 1.91 |
| Test 2 (μm) | 0.804 | 2.04 |
| Average size (μm) | 0.808 | 1.975 |
|  | Test 3 | Test 4 |
| Rotor speed (rpm) | 4,000 | 4,000 |
| Valve 9 | Open | Dynamic pressure |
| Test 1 (μm) | 0.437 | 1.340 |
| Test 2 (μm) | 0.440 | 1.330 |
| Average size (μm) | 0.439 | 1.335 |
|  | Test 5 | Test 6 |
| Rotor speed (rpm) | 5,000 | 5,000 |
| Valve 9 | Open | Dynamic pressure |
| Test 1 (μm) | 0.374 | 0.608 |
| Test 2 (μm) | 0.371 | 0.610 |
| Average size (μm) | 0.373 | 0.609 |

A further experimental series involving Tests 7 to 12 was conducted with the quick addition of the oil; i.e., six liters over the course of 20 seconds. The results are shown in the table below.

|  | Test 7 | Test 8 |
| --- | --- | --- |
| Rotor speed (rpm) | 3,000 | 3,000 |
| Valve 9 | Open | Dynamic pressure |
| Test 1 (μm) | 0.561 | 2.370 |

-continued

|  | Test 2 (µm) | 0.562 | 2.290 |
|---|---|---|---|
|  | Average size (µm) | 0.562 | 2.330 |
|  |  | Test 9 | Test 10 |
| Rotor speed (rpm) |  | 4,000 | 4,000 |
| Valve 9 |  | Open | Dynamic pressure |
| Test 1 (µm) |  | 0.405 | 1.710 |
| Test 2 (µm) |  | 0.406 | 1.720 |
| Average size (µm) |  | 0.406 | 1.715 |
|  |  | Test 11 | Test 12 |
| Rotor speed (rpm) |  | 5,000 | 5,000 |
| Valve 9 |  | Open | Dynamic pressure |
| Test 1 (µm) |  | 0.351 | 0.460 |
| Test 2 (µm) |  | 0.353 | 0.441 |
| Average size (µm) |  | 0.352 | 0.451 |

A raw emulsion (premix) was produced in the container in a further experiment with completely opened valve 9; specifically by premixing the oil phase and the water phase. The raw emulsion had a drop size distribution of a mean diameter of approximately 37 micrometers.

After passing through the rotor-stator system at a speed of 4,000 revolutions per minute, the mean diameter was only 5.363 micrometers. If the raw emulsion is directed through the rotor-stator system once more at 5,000 revolutions per minute, the achieved mean diameter is 2,504 micrometers. If the product is run for 15 minutes inside the circulation through the system at a rotor speed of 5,000 revolutions per minute, it runs approximately 52 times through the dispersion machine; the achieved drop diameter is 0.347 micrometers. The above figures relate to one measurement. As in tests 1 to 12, several measurements were conducted as well. The results are summarized in the table below.

|  | Raw emulsion | 1 passage, 4,000 rpm |
|---|---|---|
| Test 1 (µm) | 36.097 | 5.363 |
| Test 2 (µm) | 37.775 | 5.471 |
| Average size (µm) | 36.936 | 5.417 |

|  | 1 passage, 5,000 rpm | 15 minutes at 5,000 rpm |
|---|---|---|
| Test 1 (µm) | 2.504 | 0.347 |
| Test 2 (µm) | 2.548 | 0.342 |
| Average size (µm) | 2.526 | 0.345 |

The experiments as described above for the production of an emulsion clearly show the influence of the counter-pressure and/or dynamic pressure relative to the droplet size, which can be applied by the positioning of the valve 9. Furthermore, the experiments show that the invention makes it possible to achieve the smallest size droplets. These droplets are smaller than the smallest mean drop sizes that can be achieved with conventional rotor-stator systems. This demonstrates the advantageous effect of the invention which helps to create and maintain a turbulent flow throughout the entire installation system.

It is clear to a person skilled in the art that the scope of the invention is not limited to the previously described embodied examples but that it can be varied in multiple different ways. In particular, the characteristics of the individual embodied examples can be combined or exchanged with each other.

LIST OF REFERENCE SIGNS

1 Container (preparation container)
13 Area of the container wall that is adjacent to the outlet
150 Longitudinal axis of the container
180 Plumb line relative to the longitudinal axis of the container
$D_1$ Diameter of the container
12 Outlet of the container
14 Container floor
15 Container wall
16 Container wall opening
2 Intermediate piece (suction head)
21 First opening of the intermediate piece
22 Second opening of the intermediate piece
25 Tube line of the intermediate piece
250 Longitudinal axis of the tube line of the intermediate piece
$a_{30}$ Inclination angle of the longitudinal axis of the tube line of the intermediate piece relative to the longitudinal axis of the container
23 Wall of the pipe
260 Area of the tube line of the intermediate piece where the wall arches toward the outside
210 First part of the tube line of the intermediate piece
220 Second part of the tube line of the intermediate piece
230 Third part of the tube line of the intermediate piece
26 Chamber for receiving the conveying means
27 Flexible element, rubber bellows
28 Flow disrupter
280 Screwed connection
3 Conveying means, specifically agitator blade
31 Agitator
32 Shaft of the agitator
33 Sleeve
34 Pressure side of the conveying means
35 Suction side of the conveying means
4 Rotor-stator dispersion machine
40 Housing
41 Rotor
42 Stator
431, 432 Inner and outer toothed ring of the stator
430, 433 Transfer area between the teeth of the inner and outer toothed ring
44, 45, 46, 47 Transfer areas through which fluid exits the rotor-stator dispersion machine
48 Discharge apparatus, specifically tube line
49 Ring channel
5 Outlet apparatus
50 Outlet channel
51 First opening of the outlet channel
510 Largest width of the rectangular first opening of the outlet channel
52 Second opening of the outlet channel
53 Cone of the outlet channel
$L_{aus}$ Length of the outlet channel
54, 55, 56, 57 Lateral surfaces of the outlet channels
60, 61, 62, 63, 64, 65, 66 Feed apparatus for adding ingredients to the outlet channel, injector
60.1, 60.2 Feed channel
650 Connecting element (flange) for connecting the feed apparatus to the outlet apparatus
648 Connecting element (flange) for connecting the feed apparatus to the discharge apparatus 7, 8 Inlet pipe connection
71 Inlet opening
710 Cross-sectional area of the inlet opening
72 Feed opening
720 Cross-sectional area of the feed opening
75 Tube line of the inlet pipe connection
751 Area of the pipe that opens into the inlet opening
$a_{100}$ Inclination angle of the longitudinal axis of the pipe of the inlet pipe connection relative to the plumb line of the longitudinal axis of the container
76 Longitudinal axis of the inlet pipe connection
9 Valve
10 Circulation line
100 Removal
115 Shaft
116 Motor
117 Seal, mechanical seal
120 Installation system
105.1 Flexible element, section of sufficiently bendable material
200 LPD housing
220 Premixing chamber
250 Feed, inlet into the premixing chamber
300 Spherical mixing chamber
400 Blow-off valve
500 Rinse water drain
600 Tubular or sheet nozzle

What is claimed is:

1. An outlet apparatus (5) for connecting a rotor-stator dispersion machine (4) with a discharge apparatus (48) for discharging fluid from the rotor-stator dispersion machine (4), wherein the outlet apparatus (5) comprises at least two outlet channels (50) such that each outlet channel has at least one adjacent outlet channel, with each outlet channel having a first opening (51) for the connection with an outside housing of the rotor-stator dispersion machine in an area surrounding the rotor-stator system and with a second opening (52) for the connection with the discharge apparatus (48), and wherein the first opening (51) has a rectangular cross-section and the second opening (52) has a smaller cross-sectional area than the first opening so that the length of the outlet apparatus (5) is substantially tapered as a cone (53) between the first and the second openings.

2. The outlet apparatus (5) as claimed in claim 1, wherein length $L_{aus}$ of the outlet channel (50) is at least equal to the largest width (510) of the rectangular first opening (51).

3. The outlet apparatus (5) as claimed claim 1, wherein the second opening (52) is circular.

4. The outlet apparatus (5) as claimed in claim 1, wherein the outlet apparatus comprises at least four outlet channels (50).

5. The outlet apparatus (5) as claimed in claim 4, wherein a transition from a lateral area (54, 55) of a first outlet channel to a lateral area (56, 57) of an adjacent outlet channel (50) describes the shape of an arch.

6. The outlet apparatus (5) as claimed in claim 1, wherein the first opening (51) of each outlet channel is dimensioned such that, substantially, each outlet channel directly transitions into a respective adjacent outlet channel.

7. The outlet apparatus (5) as claimed in claim 1, wherein at least one outlet channel (50) comprises a feed apparatus (60) for adding ingredients in solid, powder and/or liquid form to a fluid that flows, during operation, through the outlet channel (50) out of the rotor-stator dispersion machine (4).

8. The outlet apparatus (5) as claimed in claim 4, wherein the outlet apparatus comprises exactly four outlet channels (50).

9. A system comprising a rotor-stator dispersion machine (4) comprising a rotor-stator system (41, 42) having at least one toothed ring (43) and an outlet apparatus (5) as claimed in claim 1, wherein a sum of the cross-sectional areas of the first opening (51) of all outlet channels (50) is substantially equal to the total free area between teeth of the at least one toothed ring (43) that is adjacent to the first opening (51) when the outlet apparatus (5) is connected with the rotor-stator dispersion machine (4).

10. A system installation (120) for the production of dispersions containing at least one fluid, the system installation comprising:
a container (1);
a rotor-stator dispersion machine (4);
a discharge apparatus (48); and
the outlet apparatus (5) as claimed in claim 1.

* * * * *